(12) United States Patent
Maruyama

(10) Patent No.: US 7,875,870 B2
(45) Date of Patent: Jan. 25, 2011

(54) RECORDING MEDIUM TYPE IDENTIFICATION DEVICE WITH OPTICAL SENSORS

(75) Inventor: Takahito Maruyama, Tokyo (JP)

(73) Assignee: Citizen Holdings Co., Ltd., Tokyo (JP)

(*) Notice: Subject to any disclaimer, the term of this patent is extended or adjusted under 35 U.S.C. 154(b) by 109 days.

(21) Appl. No.: 12/059,673

(22) Filed: Mar. 31, 2008

(65) Prior Publication Data

US 2008/0244629 A1  Oct. 2, 2008

(30) Foreign Application Priority Data

Mar. 30, 2007 (JP) ............................. 2007-095272

(51) Int. Cl.
  *G01N 21/86* (2006.01)
  *G06K 7/00* (2006.01)
  *H05K 7/10* (2006.01)

(52) U.S. Cl. .............. 250/559.4; 235/435; 710/301

(58) Field of Classification Search .............. 250/559.4, 250/559.36; 235/435, 460; 710/301
See application file for complete search history.

(56) References Cited

U.S. PATENT DOCUMENTS 5,072,259 A * 12/1991 Ikeda ........................ 399/190
6,636,911 B2 * 10/2003 Kazo ........................... 710/62

FOREIGN PATENT DOCUMENTS

| JP | 01-145794 A | 6/1989 |
| JP | 11-321018 A | 11/1999 |
| JP | 2000-306124 A | 11/2000 |
| JP | 2005-078192 A | 3/2005 |
| JP | 2005-235063 A | 9/2005 |

* cited by examiner

*Primary Examiner*—Thanh X Luu
(74) *Attorney, Agent, or Firm*—Westerman, Hattori, Daniels & Adrian, LLP

(57) ABSTRACT

According to the present invention, during identification of recording medium type, positioning of a recording medium at a measurement position for measuring the recording medium is facilitated, and the number of sensors for measuring the recording medium is reduced. In addition to identifying recording medium type, the top/reverse of the inserted recording medium can also be identified by way of a simple construction. A recording medium identification device, which identifies the type of a recording medium inserted through an insertion slot, comprises a plurality of sensors arranged in a band-like region having a predetermined width, in a depth direction, and a plurality of sensors arranged in a band-like region having a predetermined width, in a width direction. Data of two types of dimensions, combining dimensions of the recording medium in the depth direction and the width direction, is acquired by respectively arranging the a plurality of sensors in two partially overlapping band-like regions arrayed forming an L-shape. A plurality of types of recording media can be identified with increased identification precision by identifying the type of the recording medium based on such combined data of two types of dimensions.

2 Claims, 28 Drawing Sheets

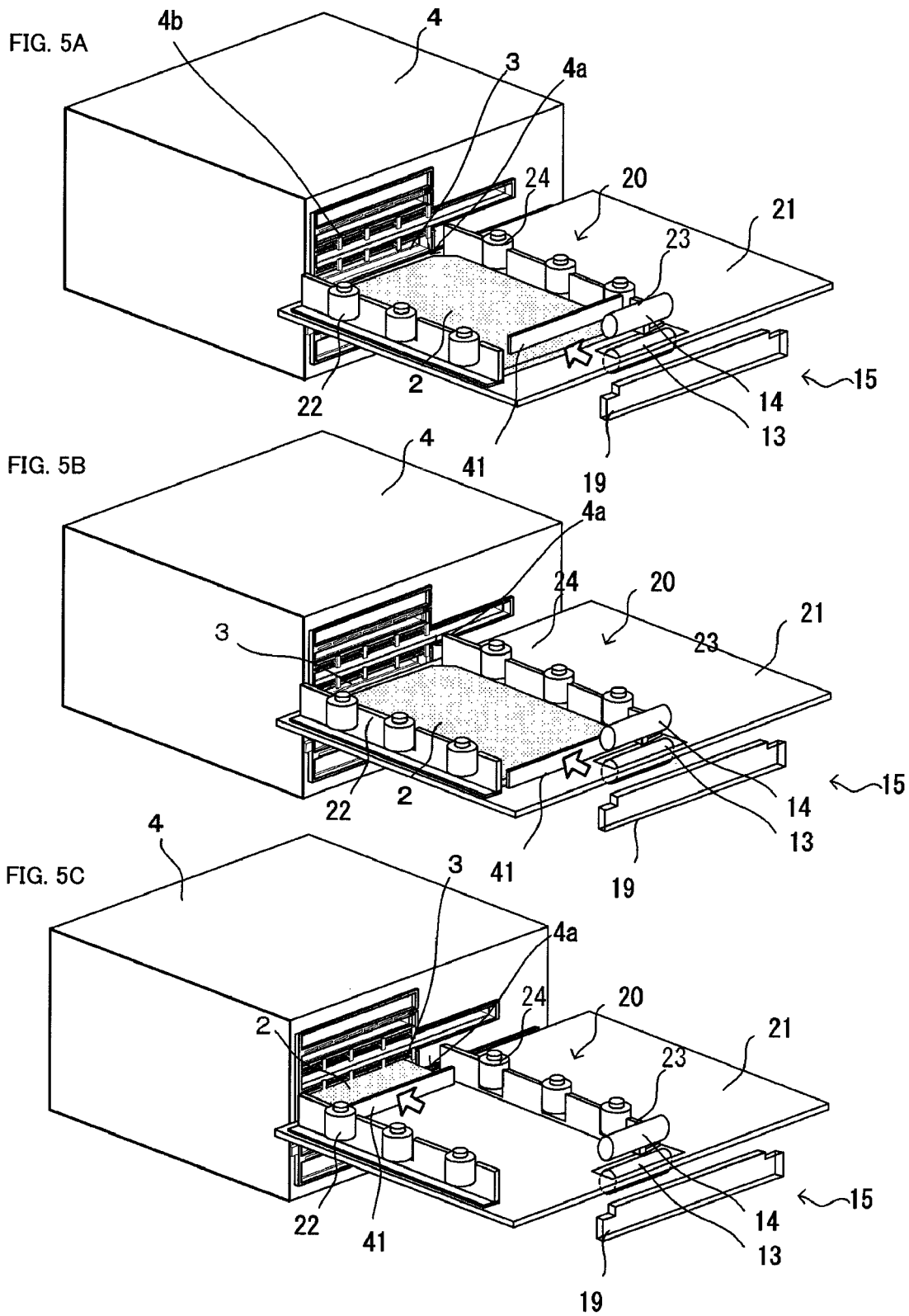

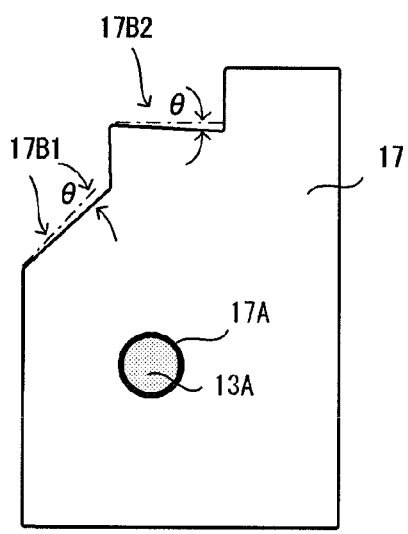
FIG. 15A
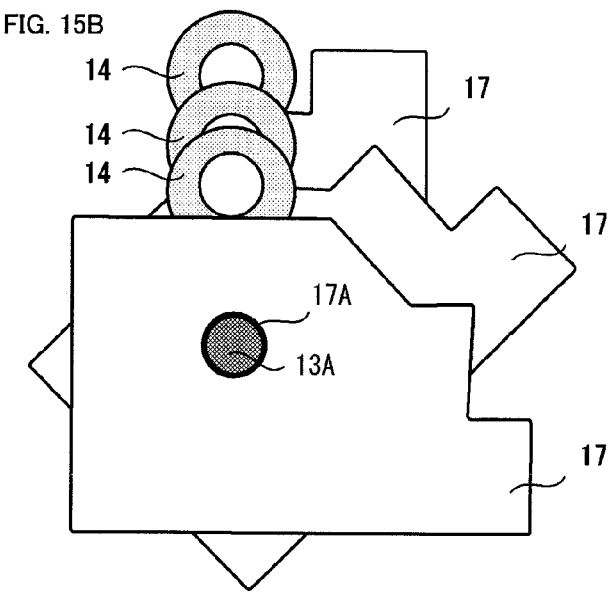
FIG. 15B
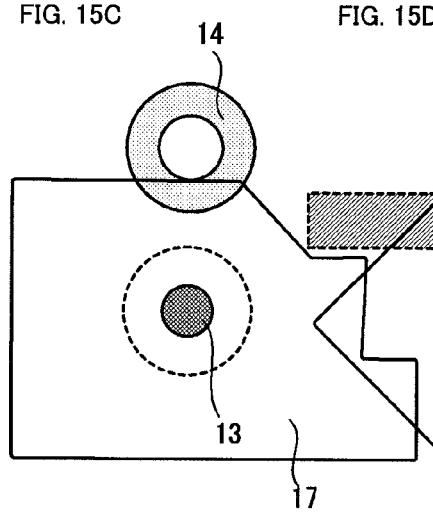
FIG. 15C
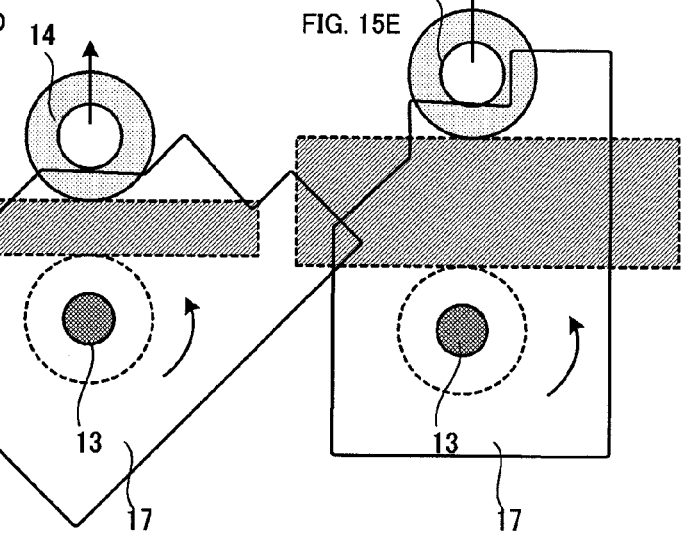
FIG. 15D
FIG. 15E

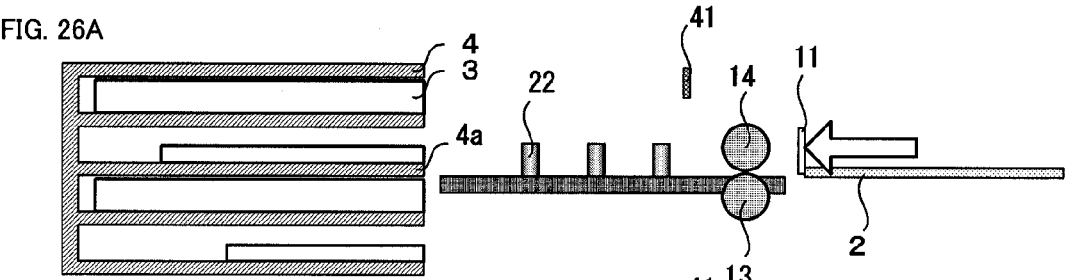
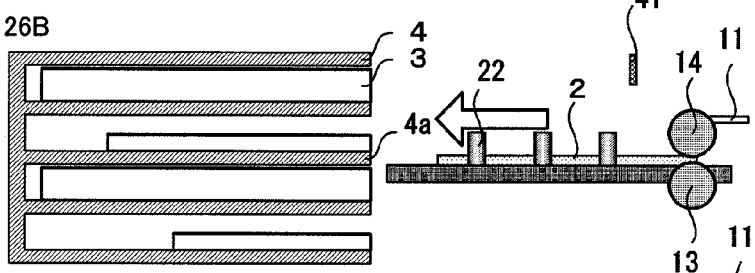
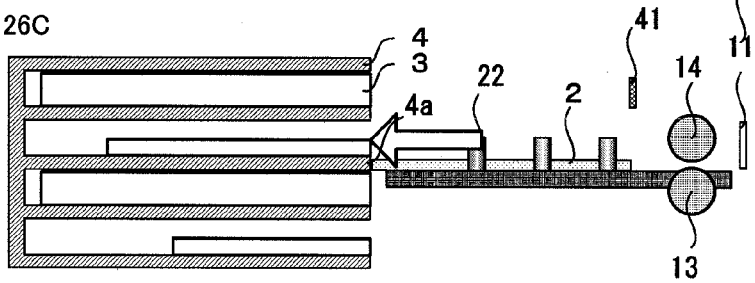
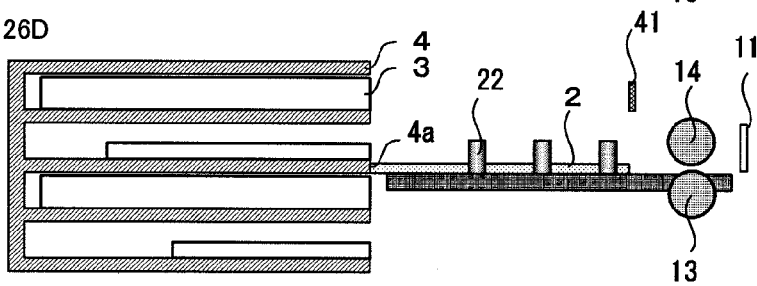
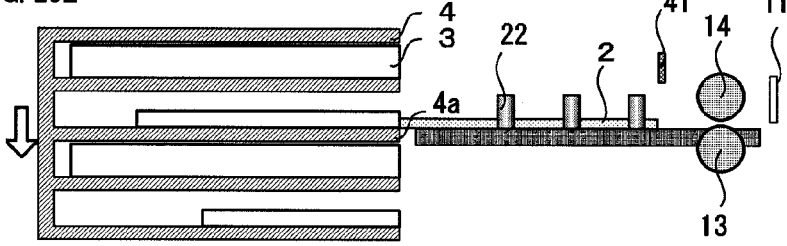
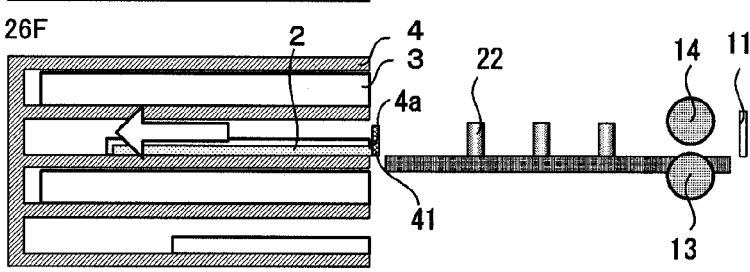

RECORDING MEDIUM TYPE IDENTIFICATION DEVICE WITH OPTICAL SENSORS

BACKGROUND OF THE INVENTION

1. Field of the Invention

The present invention relates to a medium identification device for identifying the type of a recording medium inserted through an insertion slot, and for connecting the identified recording medium to a corresponding connector.

2. Description of the Related Art

Known image printing devices include printing devices that print image data by reading image data written in an inserted recording medium. Examples of such recording media include, for instance, miniSD™, SD™, SmartMedia™, Memory Stick™, MMC™, RS-MMC™, xD-Picture Card™, Compact Flash (CF)®, Microdrive (Md)® and the like. ™ stands for a trade mark, and ® stands for a registered trade mark.

Image printing devices have been proposed in which a single device is compatible with these various types of recording media (for instance, Japanese Unexamined Patent Application Laid-open Nos. H11-321018, 2005-78192 and 2005-235063).

Japanese Unexamined Patent Application Laid-open No. H11-321018 discloses an image printing device in which, in order to identify the type of a memory card as a recording medium, a light source and a optical sensor are arranged between which the memory card is flanked, so that the type of the memory card is identified based on the size of a region shielded by the memory card. A card slot corresponding to the inserted memory card is displaced to be connected with the memory card.

Japanese Unexamined Patent Application Laid-open No. 2005-78192 discloses an image printing device in which, in order to identify the type of a memory card as a recording medium, segmented members are made to slide abutting the memory card, such that the type of the memory card is identified through measurement, by such sliding members, of the depth, width and thickness of the memory card. In addition, the type of the memory card is identified by infrared sensors arranged in a two-dimensional array that measure the depth, width and surface area of the memory card.

Japanese Unexamined Patent Application Laid-open No. 2005-235063 discloses an image printing device in which an image captured by camera is compared with an image prepared beforehand for specifying a type, to identify thereby the type of a memory card as a recording medium, and discloses the features of, after type identification, selecting a corresponding connector by vertically moving the connector, and joining the connector with the memory card through further sliding of the selected connector.

In the ticketing device disclosed in Japanese Unexamined Patent Application Laid-open No. 2000-306124 there are arranged a plurality of sensors in a medium feed direction, such that when a reference sensor among the a plurality of sensors detects a medium, the type of the medium is identified on the basis of whether or not the other sensors detect the medium.

In the card discriminator disclosed in Japanese Unexamined Patent Application Laid-open No. H01-145794, an IC chip portion or IC contacts are detected by an optical sensor in order to discriminate between an IC card and a magnetic card.

In Japanese Unexamined Patent Application Laid-open No. H11-321018 the type of a memory card is identified based on the size of a region blocked by the memory card, and hence no identification is performed between the top/reverse of the memory card and/or between before and after insertion. Hence, the type of the recording medium may not be determined accurately if the recording medium is inserted in an orientation other than a predetermined orientation.

Japanese Unexamined Patent Application Laid-open No. 2005-78192 is problematic in that, during identification of the type of a memory card through measurement, by a sliding member, of the depth, width and thickness of the memory card, defective contact between the member and the memory card may result in misdetection, while identification of the type of the memory card through measurement of the depth, width and surface area of the memory card by way of an infrared sensor requires providing multiple sensors.

In Japanese Unexamined Patent Application Laid-open No. 2005-78192, the top/reverse of an inserted memory card is identified by a sensor for top/reverse detection that detects a memory card cut, and in which, when the memory card has no cut, identification of the top/reverse of the memory card is carried out by detecting insertion or non-insertion of the memory card. However, detection of the top/reverse of a memory card using a cut sensor is problematic in that positioning of the memory card to the measurement position must be precise in order to prevent misdetection. Detection and identification of memory card top/reverse on the basis of insertion or non-insertion of the memory card is also problematic in that there is required a separate means for detecting the insertion or non-insertion of the memory card.

Japanese Unexamined Patent Application Laid-open No. 2005-235063 is likewise problematic in that it requires a camera for imaging an image of the recording medium, and requires also preparing beforehand a comparative image for identifying the type of the recording medium. Similarly to Japanese Unexamined Patent Application Laid-open No 2005-78192, Japanese Unexamined Patent Application Laid-open No. 2005-235063 is problematic also in requiring positioning precision for positioning the recording medium at the measurement position. In addition to moving vertically, the connector must be displaced towards the recording medium to be joined therewith. This results in a complex connector moving mechanism, which is problematic.

Japanese Unexamined Patent Application Laid-open No. 2000-306124 is likewise problematic in that the type of a medium is identified based on the relationship between the array pitch of a plurality of sensors and the length of the medium, and hence similar medium lengths resulting in differences close to the detection precision of the sensors may impair identification precision and/or give rise to erroneous determination, while precluding discrimination between the top/reverse of the medium.

Japanese Unexamined Patent Application Laid-open No. H01-145794 is problematic in that it allows only identifying whether a card is an IC card or a magnetic card, and cannot deal hence with a wide variety of cards.

SUMMARY OF THE INVENTION

With a view to solving the above conventional problems, it is an object of the present invention to facilitate positioning of a recording medium at a measurement position for measuring the recording medium, during identification of recording medium type, and to reduce the number of sensors for measuring the recording medium. In addition to identifying recording medium type, it is a further object of the present invention to identify the top/reverse of the inserted recording medium by way of a simple construction.

The recording medium identification device of the present invention is a recording medium identification device for identifying the type of a recording medium inserted through an insertion slot, comprising a plurality of sensors arranged in a band-like region having a predetermined width, in the depth direction, and a plurality of sensors arranged in a band-like region having a predetermined width, in the width direction.

In the present invention, data of two types of dimensions, combining dimensions of the recording medium in the depth direction and the width direction, is acquired by respectively arranging the a plurality of sensors in two partially overlapping band-like regions arrayed forming an L-shape. A plurality of types of recording media can be identified with increased identification precision by identifying the type of the recording medium based on such combined data of two types of dimensions.

To carry out positioning between a recording medium and a plurality of sensors arranged in two band-like regions, the recording medium identification device of the present invention comprises a depth direction positioning member for determining a reference position of the recording medium in the depth direction, and a width direction positioning member, at a plane parallel to the surface of the recording medium, for determining a reference position in the width direction.

In the present invention, carrying out two-direction positioning by way of the depth direction positioning member and the width direction positioning member allows positioning the recording medium, without plane-surface offset, while affording accurate detection by a plurality of sensors arranged in the two band-like regions.

The recording medium identification device of the present invention has a plurality of sensors comprising a plurality of transmission type photosensors and at least one reflective type photosensor.

The transmission type photosensors are arranged at positions for detecting the corners of the recording medium positioned at a predetermined position. For instance, the vertical-direction or horizontal-direction corners of the recording medium are arranged at the position for detection, then there is detected transmission or non-transmission of light on account of the recording medium arranged at the predetermined position, so that the type of the recording medium and the top/reverse of the recording medium are identified by combining the detection results of the transmission type photosensors arranged the respective positions.

The reflective type photosensor is arranged at a position for detecting an electric terminal of the recording medium positioned at a predetermined position. The reflective type photosensor is arranged at a position corresponding to that of the electric terminal of the recording medium when the latter is arranged at a predetermined position, so that the top/reverse of the inserted recording medium is identified on the basis of whether or not light is reflected by the electric terminal. The electric terminal of the recording medium is formed of a metallic member and hence possesses a higher reflectance than the cover portions of the recording medium. The reflective type photosensor utilizes this difference in reflectance, which allows determining whether the recording medium is inserted with the top or the reverse facing up, on the basis of the presence or absence of the electric terminal.

The type of the recording medium, or the type of the recording medium and the top/reverse of the recording medium are identified based on a detection signal of the transmission type photosensors. The top/reverse of the recording medium is identified based on the detection signal of the reflective type photosensor.

In addition to such a sensor mechanism for identifying media based on sensor output, the medium identification device of the present invention can also comprise a recording medium insertion/ejection unit for inserting the recording medium into the device and ejecting the recording medium out of the device; a recording medium transport unit for transporting the recording medium between the recording medium insertion/ejection unit and a recording medium identification unit; and a recording medium setting/removing unit for setting into a connector the recording medium inserted in the device and for removing the recording medium from the connector. The recording medium identification device of the present invention allows thus identifying the type of recording media of a plurality of types, and guiding connection between the recording medium and a connector corresponding to the identified type.

The recording medium identification unit comprised in the medium identification device of the present invention allows reducing the number of sensors for measuring the recording medium during identification of the type of recording medium. In addition to identifying recording medium type, the top/reverse of the inserted recording medium can also be identified by way of a simple construction.

BRIEF DESCRIPTION OF THE DRAWINGS

FIG. 5 is an operation diagram for explaining an operation example of the medium identification device of the present invention;

FIG. 15 is a diagram for explaining the relationship between levers and a driven roller in the present invention;

FIG. 26 is an operation diagram for explaining a series of operations by the medium identification device of the present invention;

DESCRIPTION OF THE PREFERRED EMBODIMENTS

The medium identification device of the present invention is explained in detail next with reference to accompanying drawings.

The schematic constitution and schematic operation of a medium identification device, and a recording medium transport unit provided in the medium identification device are explained first with reference to FIGS. 1 to 7. The schematic constitution and schematic operation of a recording medium insertion/ejection unit comprised in the medium identification device of the present invention are explained with reference to FIGS. 8 to 15. The schematic constitution and schematic operation of a recording medium identification unit comprised in the medium identification device of the present invention are explained with reference to FIGS. 16 to 19. The schematic constitution and schematic operation of a recording medium setting/removing unit comprised in the medium identification device of the present invention are explained with reference to FIGS. 20 to 22. A series of operations by the medium identification device of the present invention is explained next with reference to FIGS. 23 to 26. A control system of the medium identification device of the present invention is explained with reference to FIG. 27.

The schematic constitution and schematic operation of a medium identification device, and the recording medium transport unit provided in the medium identification device are explained first.

Figure 1:
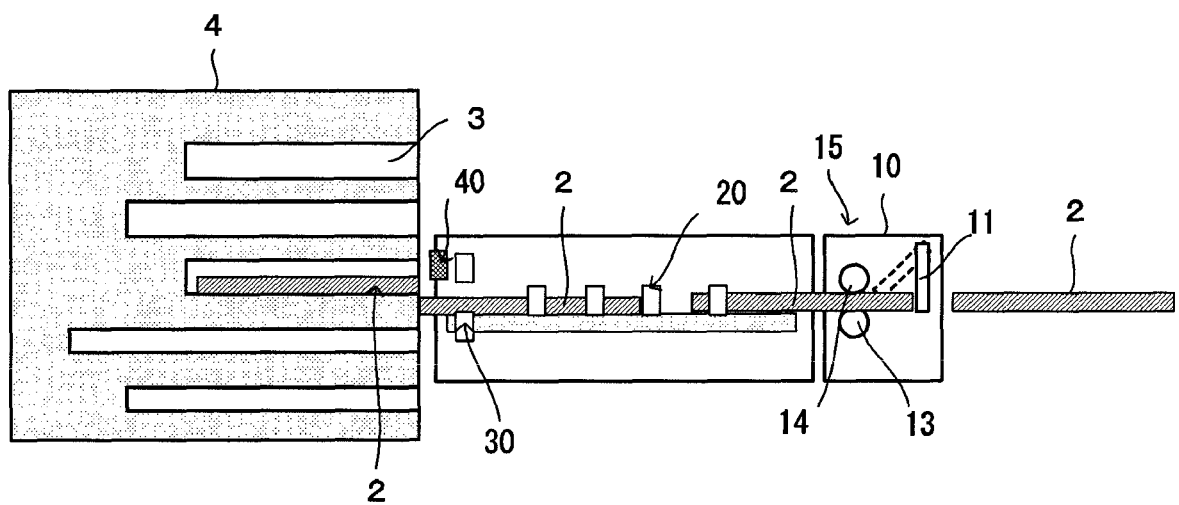
FIG. 1 is a block diagram for explaining the schematic constitution of a medium identification device of the present invention.
Figure 2:
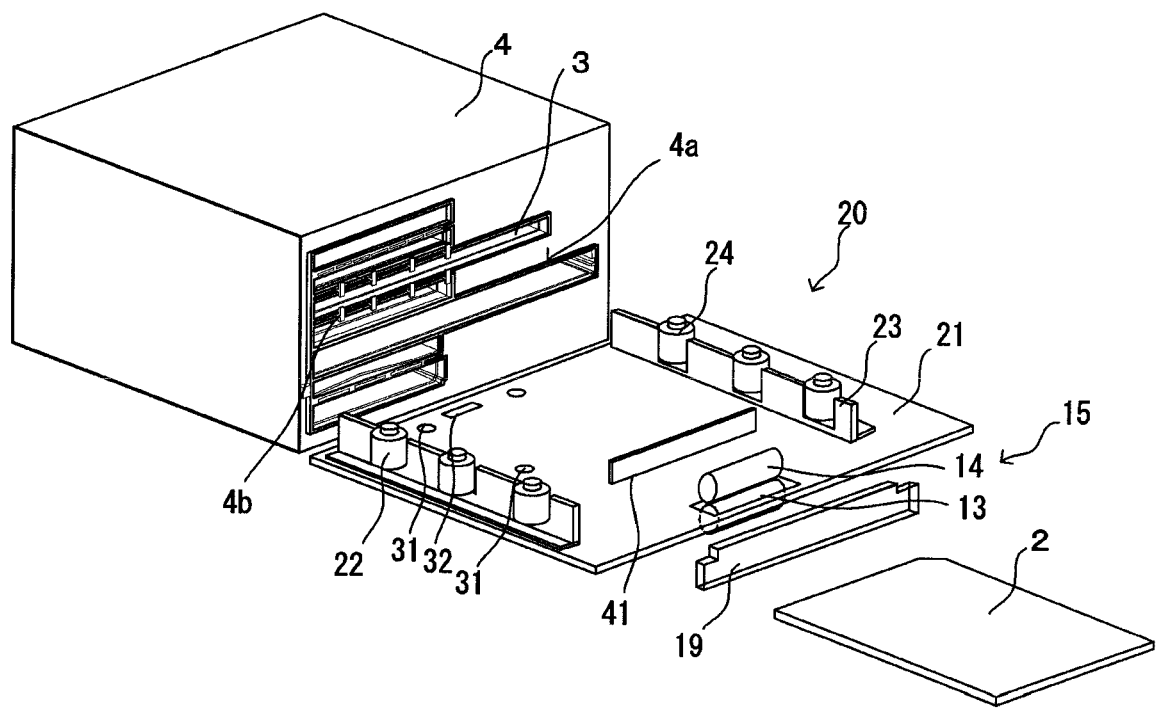
FIG. 2 is a schematic constitution diagram for explaining the schematic constitution of a medium identification device of the present invention.

FIG. 1 and FIG. 2 are a block diagram and a schematic diagram, respectively, for explaining the schematic constitution of a medium identification device of the present invention. In FIG. 1 and FIG. 2, a medium identification device 1 of the present invention comprises a recording medium insertion/ejection unit 10 for inserting a recording medium 2 into the device and ejecting the recording medium out of the device; a recording medium identification unit 30 for identifying the type of the recording medium 2 inserted in the device; a recording medium transport unit 20 between the recording medium insertion/ejection unit 10 and the recording medium identification unit 30, for transporting the recording medium 2; and a recording medium setting/removing unit 40 for readably setting the recording medium 2, by inserting into a connector 3 the recording medium 2 inserted in the device, and for releasing and removing, out of the connector 3, the recording medium 2 set into in the connector 3.

The recording medium insertion/ejection unit 10 takes the recording medium 2 into the device. The recording medium transport unit 20 transports the recording medium 2 thus taken in towards the recording medium identification unit 30, whereupon the front end of the recording medium 2 abuts the end face of a connector rack 4. The recording medium 2 is thus always positioned at a predetermined position in the recording medium identification unit 30.

The recording medium identification unit 30 identifies the type of the recording medium 2, and selects the connector 3 in accordance with the type of the recording medium 2. The connector rack 4 moves vertically, and aligns the position of the selected connector 3 to the same height as that of the recording medium 2.

The recording medium setting/removing unit 40 pushes the rear end of the recording medium 2 towards the connector 3, thereby setting the recording medium 2 into the connector 3 and connecting the recording medium 2 with the connector 3. Transport of the recording medium 2 into the connector 3 is effected by a pressure roller 24 provided on a side guide 23 and a medium transport roller 22. The recording medium 2 is transported by being pinched between the medium transport roller 22 constituting a driving roller, and the pressure roller 24 constituting a driven roller. In the side guide 23 there is provided at least one pressure roller 24 on the connector 3 side, in such a way that the pressure roller 24 is urged towards the medium transport roller 22 by means of a spring or the like.

Upon insertion of the recording medium 2 into the connector 3, the pressure roller 24 comes into contact with the side face of the recording medium 2, whereupon the latter is moved while pinched between the rotating medium transport roller 22 and the pressure roller 24, to be inserted into the connector 3. Once the end of the recording medium 2 has moved away from the pressure roller 24 and the medium transport roller 22, the recording medium 2 is pushed into the connector 3 by a push lever 41 provided in the recording medium setting/removing unit 40. Once the recording medium 2 is set into the connector 3, the data recorded in the recording medium 2 is read by the connector 3 and an image is printed.

When data reading is over, the recording medium setting/removing unit 40 pushes the rear end of the recording medium 2 to remove the recording medium 2 from the connector 3. Employing a push-push connector 3 allows setting and removing the recording medium 2 simply by pushing the rear end of the recording medium 2.

The recording medium transport unit 20 transports the recording medium 2 removed from the connector 3 to the recording medium insertion/ejection unit 10. The push lever 41 pushes the recording medium 2 for removing the recording medium 2 from the connector 3. As a result, the recording medium 2 is released and pushed out of the push-push connector 3. When the recording medium 2 is pushed out of the slot of the connector 3, the pressure roller 24 comes into contact with the front end side of the recording medium 2 pushed out of the connector 3. The recording medium 2 becomes pinched between the medium transport roller 22 and the pressure roller 24. Through roller rotation, the medium transport roller 22 and the pressure roller 24 cause the recording medium 2, pinched therebetween, to be transported out of the connector 3. The recording medium insertion/ejection unit 10 ejects the transported recording medium 2 out of the device.

The above constitution is not limited to only one pressure roller 24, provided in the side guide 23, being arranged on the connector 3 side, and thus a plurality of pressure rollers 24 may be provided along the side guide 23, in addition to the roller on the side of the connector 3.

With reference to FIG. 2, the recording medium insertion/ejection unit 10 comprises a roller driving unit 15 for inserting and ejecting the recording medium 2, the roller driving unit 15 comprising a swingably supported shutter 11 that is urged to an angular position where it blocks an insertion slot; an insertion roller 13 driven by a driving motor (not shown); and a driven roller 14 for pushing the recording medium 2 against the insertion roller 13.

The roller driving unit 15 determines the height position of the driven roller 14 according to the swinging of the shutter 11, and determines the gap between the insertion roller 13 and the driven roller 14 in accordance with the thickness of the inserted recording medium 2.

The recording medium transport unit 20 has a table 21 on which the recording medium 2 is slidably supported; the medium transport roller 22 fixed to the table 21, for transporting the recording medium 2 in the insertion direction of the recording medium 2; and the pressure roller 24, movable across the table 21 in a direction perpendicular to the insertion direction of the recording medium 2, for pushing the recording medium 2 towards the medium transport roller 22. The recording medium transport unit 20 comprises also a side guide 23 for aligning the recording medium 2 in the width direction through the action of the pressure roller 24.

The pressure roller 24 pushes the recording medium 2 against the medium transport roller 22 to align the recording medium 2 in the width direction. In this state, the medium transport roller 22 moves the recording medium 2 in the insertion direction.

By having the pressure roller 24 push the recording medium 2 against the medium transport roller 22, one side of the recording medium 2 can be positioned at the position of the medium transport roller 22 even for dissimilar width dimensions of the recording medium 2, while preventing idle transport by the medium transport roller 22.

The medium transport roller 22 is driven, together with the insertion roller 13, by a medium feed motor (not shown), while the side guide 23 is driven by a side guide motor (not shown).

The recording medium identification unit 30 comprises a plurality of transmission type photosensors 31 and at least one reflective type photosensor 32. The transmission type photosensors 31, which are arranged at positions for detecting the corners of the recording medium 2 that is transported and positioned at a predetermined position, identify the type of the recording medium 2, or the type of the recording medium 2 and the top/reverse of the recording medium 2, on the basis of a detection signal. Meanwhile, the reflective type photosensor 32, which is arranged at a position for detecting an electric terminal of the recording medium 2 at a predetermined position, discriminates between the top/reverse of the recording medium 2 on the basis of a detection signal.

In such recording medium identification, the recording medium transport unit 20 causes the recording medium 2 to abut a rack end face 4a of the connector rack 4 where a plurality of connectors 3 are arranged, thereby positioning the recording medium 2 using the rack end face 4a as an indicator for positioning. Other than the above-described rack end face 4a of the connector rack 4, a stopper 4b provided on the insertion slot side of the connector rack 4 may also be used as an indicator for positioning. Whatever the indicator used for positioning, the end position of the insertion slot side of the connector rack 4 can be made into a reference position for positioning, so that simple abutting of the front end of the recording medium 2 allows positioning the latter always at the same position in the depth direction of the recording medium.

Also, simple vertical motion of the connector rack 4 allows releasing the contact of the recording medium 2 against the rack end face 4a or the stopper 4b while positioning the recording medium 2 at the insertion height of the connector 3. The type of recording medium can be easily identified by positioning the recording medium at a reference position.

The stopper 4b is provided at any position around the insertion slot that does not interfere with the insertion of the recording medium 2, including a position between adjacent connectors 3. When a stopper 4b is provided, the front end position of the stopper 4b becomes a reference position for positioning.

The recording medium setting/removing unit 40 has the push lever 41 for pushing the rear end of the recording medium 2. Herein, an arm provided in the push lever 41 is made to move along a guide rod (not shown), the arm end being guided along a guide groove, to cause thereby the push lever to abut the rear end of the recording medium, to cause thereby the recording medium 2 to be set into, and removed from, the connector 3.

Figure 3:
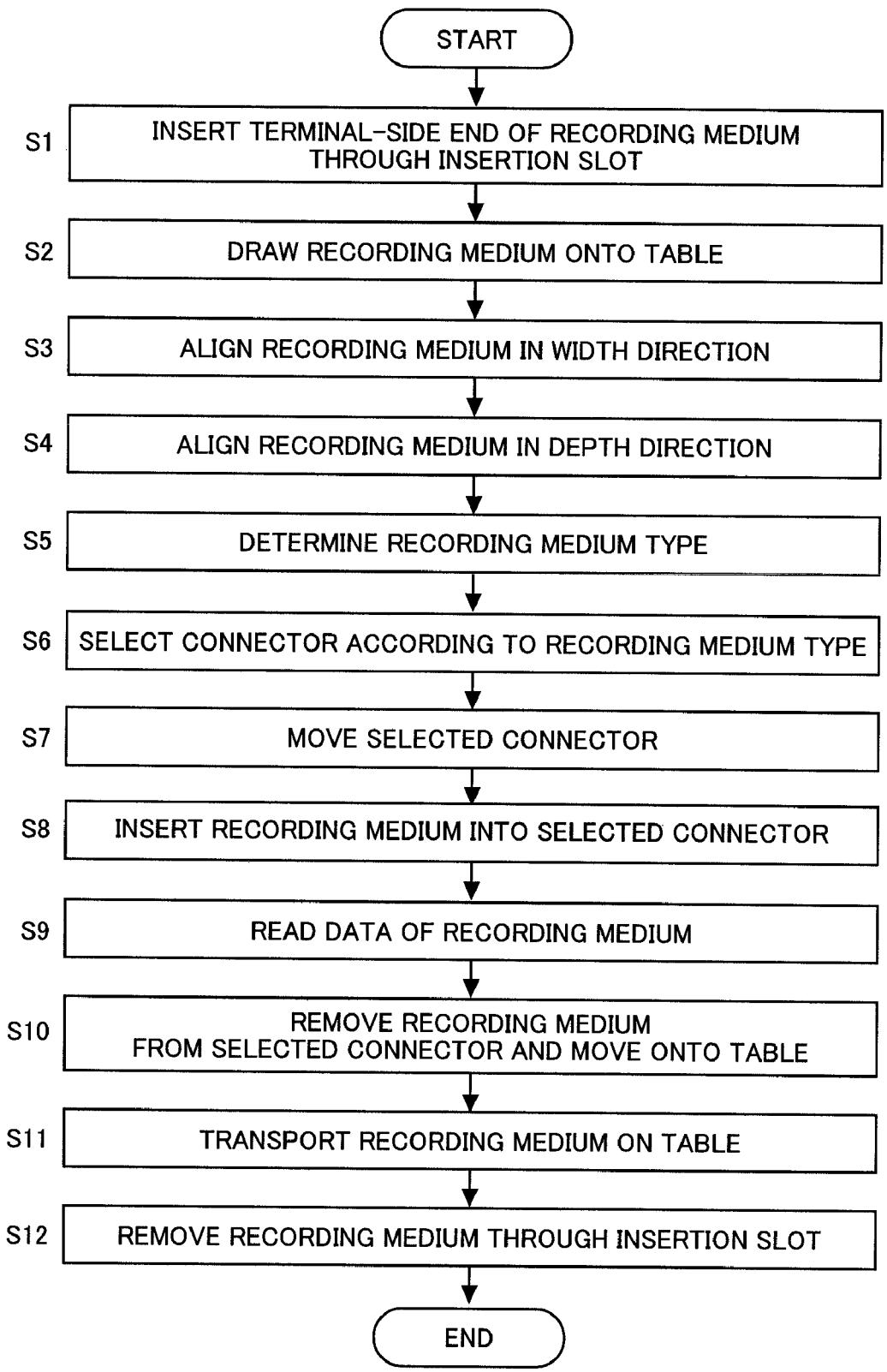
FIG. 3 is a flowchart for explaining an operation example of the medium identification device of the present invention.
Figure 4A:
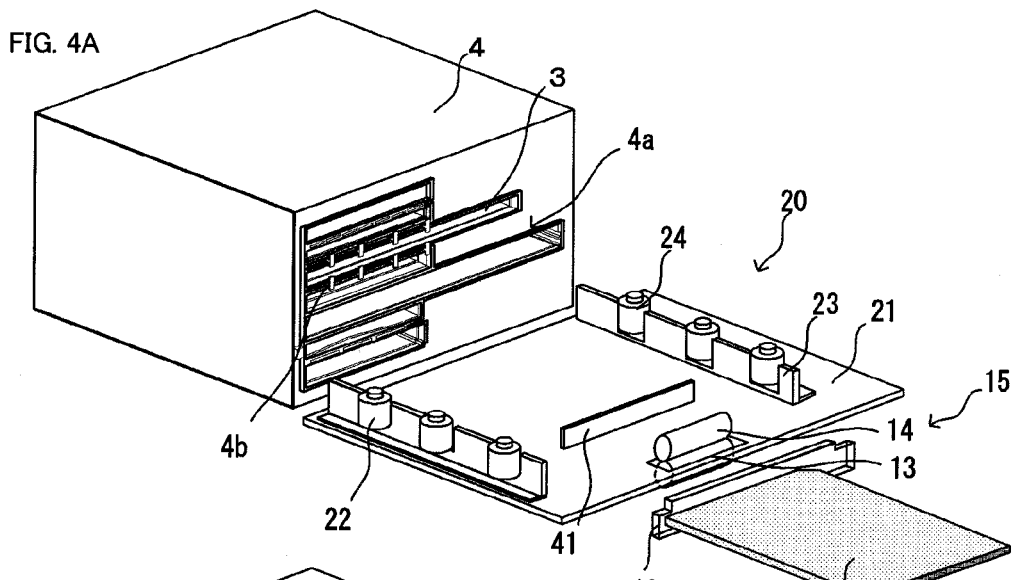
FIG. 4 is an operation diagram for explaining an operation example of the medium identification device of the present invention.
Figure 4B:
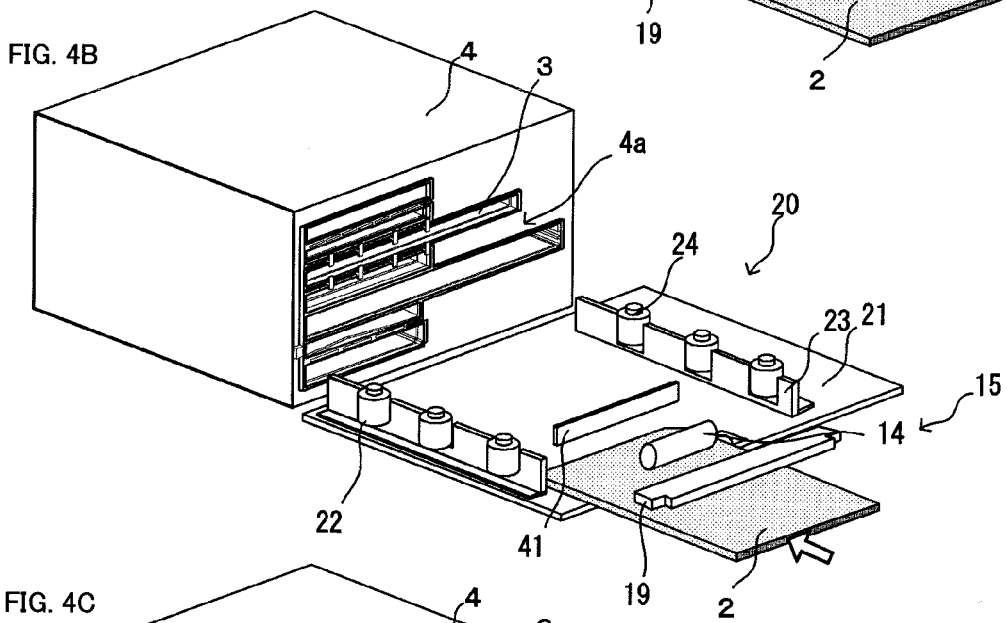
Figure 4C:
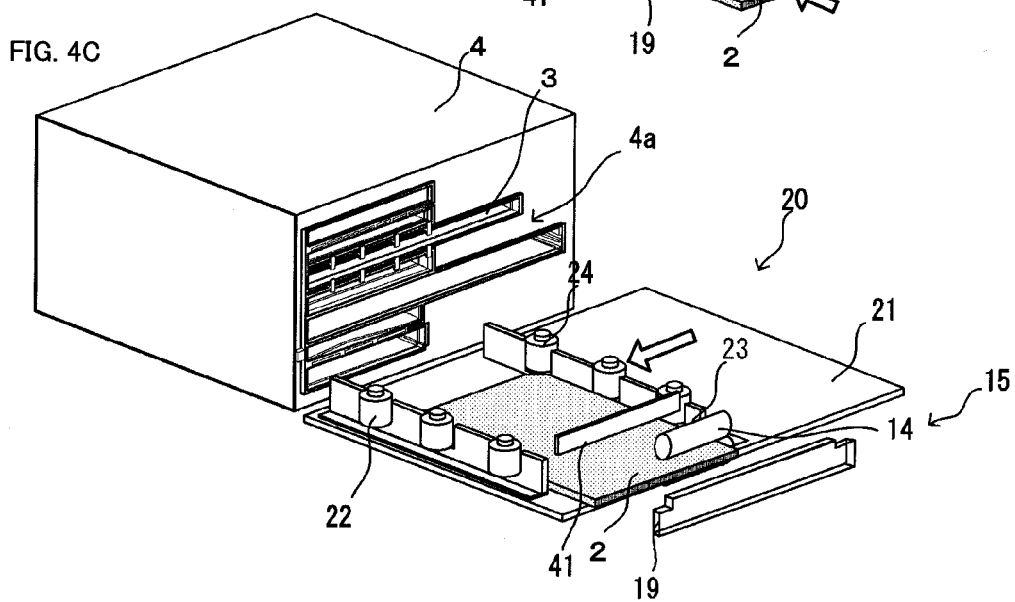
Figure 6A:
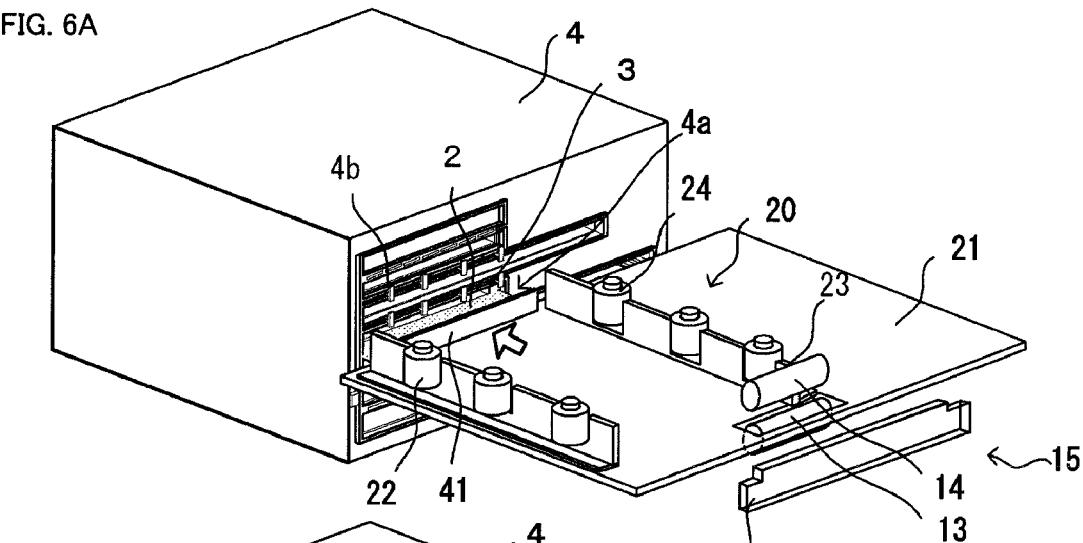
FIG. 6 is an operation diagram for explaining an operation example of the medium identification device of the present invention.
Figure 6B:
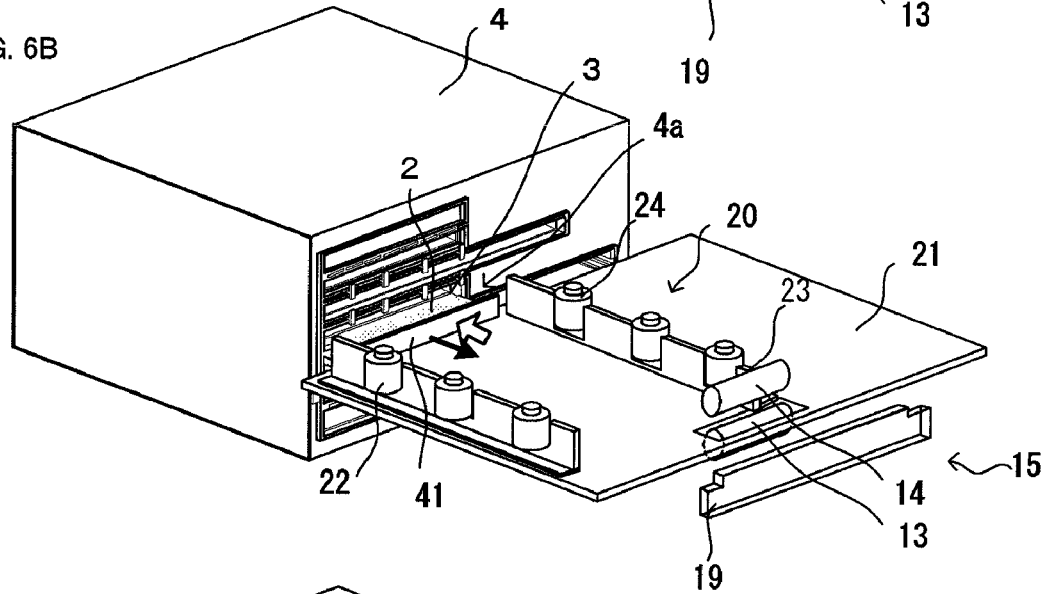
Figure 6C:
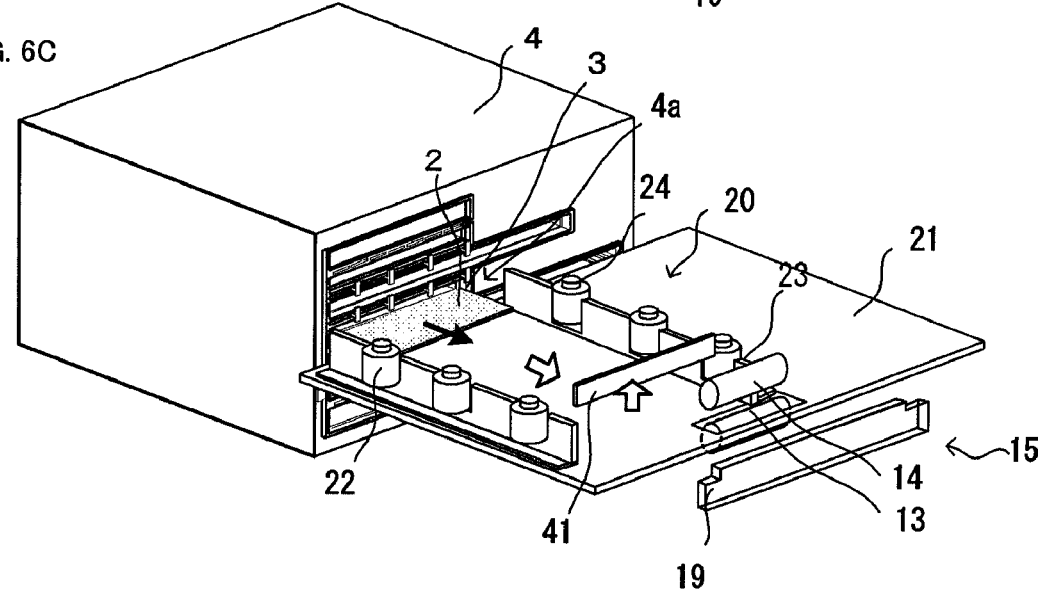
Figure 7A:
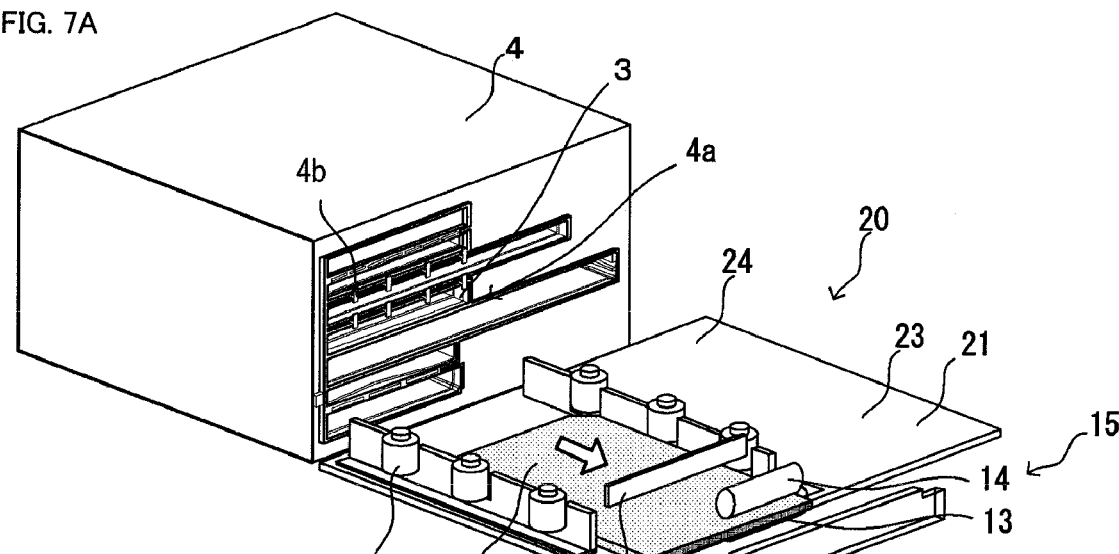
FIG. 7 is an operation diagram for explaining an operation example of the medium identification device of the present invention.
Figure 7B:
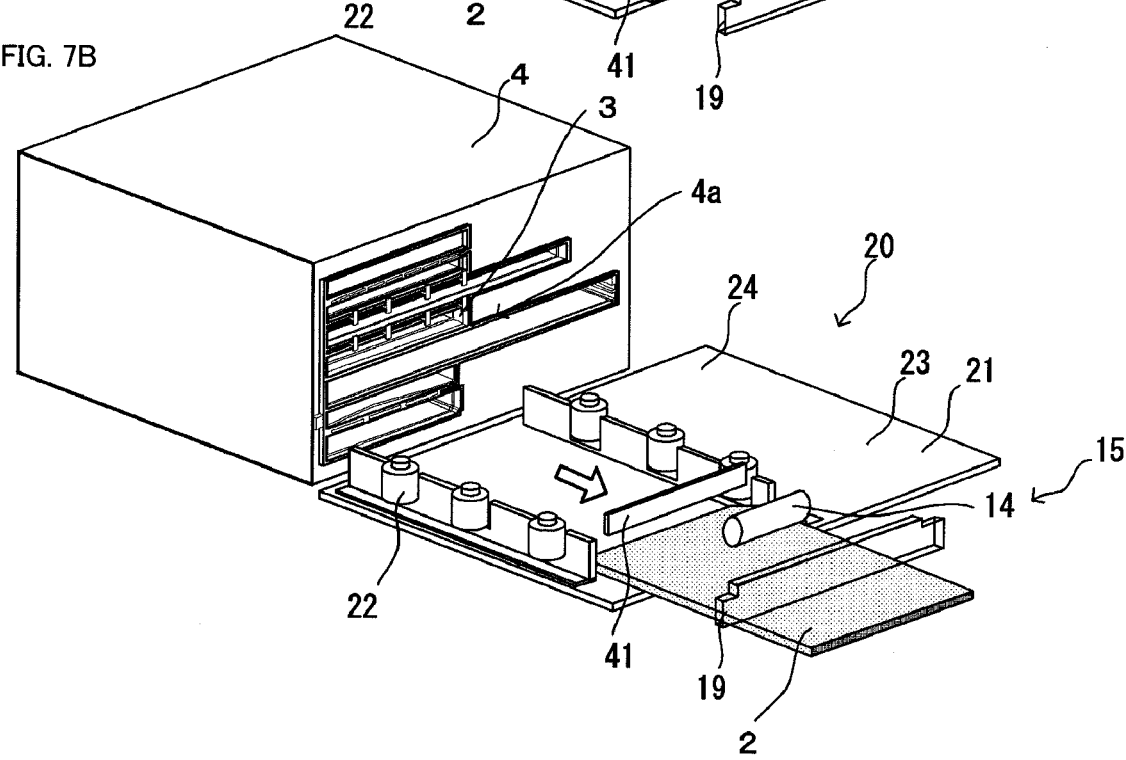

An operation example of the medium identification device of the present invention is explained next with reference to the operation flowchart illustrated in FIG. 3 and the operation diagrams illustrated in FIGS. 4 to 7. FIGS. 4 and 5 illustrate the operation of recording medium setting into the connector, while FIGS. 6 and 7 illustrate the operation of removing the recording medium from the connector and out of the medium identification device.

The operation of setting the recording medium into the connector will be explained first. The front end portion of the recording medium 2 (terminal side end portion where electrodes are provided) is pushed against the shutter 11 of an insertion slot 19 of the medium identification device 1, whereupon the shutter 11 swings and opens (FIG. 4A), (S1).

In response to the swinging of the shutter 11, the recording medium insertion/ejection unit 10 causes the driven roller 14 to move upward, whereby the recording medium 2 becomes nipped by the driven roller 14 and the insertion roller 13. The recording medium 2, nipped between the driven roller 14 and the insertion roller 13, which is driven by a driving motor (medium feed motor), is pulled in towards the table 21 (FIG. 4B), (S2).

In the recording medium transport unit 20, a driving motor (side guide motor) drives the side guide 23, whereby the pressure roller 24 is pressed against one side of the inserted recording medium 2, pushing thus the recording medium 2 towards the medium transport roller 22. The medium transport roller 22 is fixed to the table 21, and hence the other side of the recording medium 2 pushed by the pressure roller 24, across the width direction, is aligned by becoming positioned at the position of the medium transport roller 22 (FIG. 4C), (S3).

The recording medium 2 aligned at the medium transport roller 22 is driven by the latter to be fed along the depth direction. The connector rack 4, in which the connectors 3 are arranged stacked in the vertical direction, is provided freely movable up-and-down at the back of the table 21. The height of the connector rack 4 is adjusted in such a way that the rack end face 4a of the connector rack 4 or the stopper 4b provided in the insertion slot of the connector 3 becomes positioned at a prolongation of the transport direction of the recording medium 2. As a result, when the recording medium 2 is transported in the direction of the connector 3, the front end of the recording medium 2 in the depth direction abuts the rack end face 4a or the stopper 4b, whereby the recording medium 2 becomes positioned in the depth direction. The front end of the recording medium 2 fed by the medium transport roller 22 abuts the rack end face 4a of the connector rack 4, and stops. The recording medium 2 becomes aligned thereby in the depth direction.

Through the above-described alignment in the width direction and the depth direction, the recording medium 2 becomes positioned at the position for medium identification (FIG. 5A), (S4).

The type and the top/reverse of the inserted recording medium 2 are determined after positioning of the recording medium 2 at a predetermined position of the medium identification unit (FIG. 5B), (S5).

A corresponding connector 3 is selected in accordance with the type of the recording medium identified by medium identification (S6). The connector rack 4 is raised by a driving motor, not shown, in such a way that the selected connector 3 reaches a level at the same height as the recording medium 2 (S7).

After positioning so that the height of the connector 3 is identical to the height of the recording medium 2 on the table 21, the recording medium 2 is inserted by the medium transport roller 22 and the pressure roller 24 into the connector 3, whereafter the push lever 41 pushes the recording medium 2 into the connector 3, to connect the recording medium 2 (FIG. 5C), (S8). The connector 3 reads data by becoming electrically connected to the set recording medium 2 (S9).

The operation for removing the recording medium is explained next. The push lever 41 pushes the rear end of the recording medium 2 (FIG. 6B), to remove the recording medium 2 from the push-push connector and bring the recording medium 2 back onto the table 21 (FIG. 6C), (S10).

The medium transport roller 22 is driven in the reverse direction, to transport thereby, towards the recording medium insertion/ejection unit 10, the recording medium 2 brought back onto the table 21. The push lever 41 is flipped up then to avoid interfering with the recording medium 2 being transported (FIG. 7A), (S11).

The recording medium insertion/ejection unit 10 ejects the recording medium 2 through the medium insertion slot 19 by reversely rotating the insertion roller 13. The driven roller 14 that had been raised up during insertion of the recording medium 2 is kept herein at the same height as during insertion, and hence the recording medium 2 brought back by the recording medium transport unit 20 becomes inserted again, without change, between the insertion roller 13 and the driven roller 14, and is propelled by the insertion roller 13 towards the medium insertion slot 19.

Herein, the rear end of the recording medium 2 pushes the shutter 11 in the reverse direction to that during insertion, so that the shutter 11 swings in the reverse direction. In response to the swinging of the shutter 11 in the reverse direction, the driven roller 14 returns to the original position (FIG. 7B), (S12).

The schematic constitution and schematic operation of the recording medium insertion/ejection unit comprised in the medium identification device of the present invention are explained next with reference to FIGS. 8 to 15.

Figure 8:
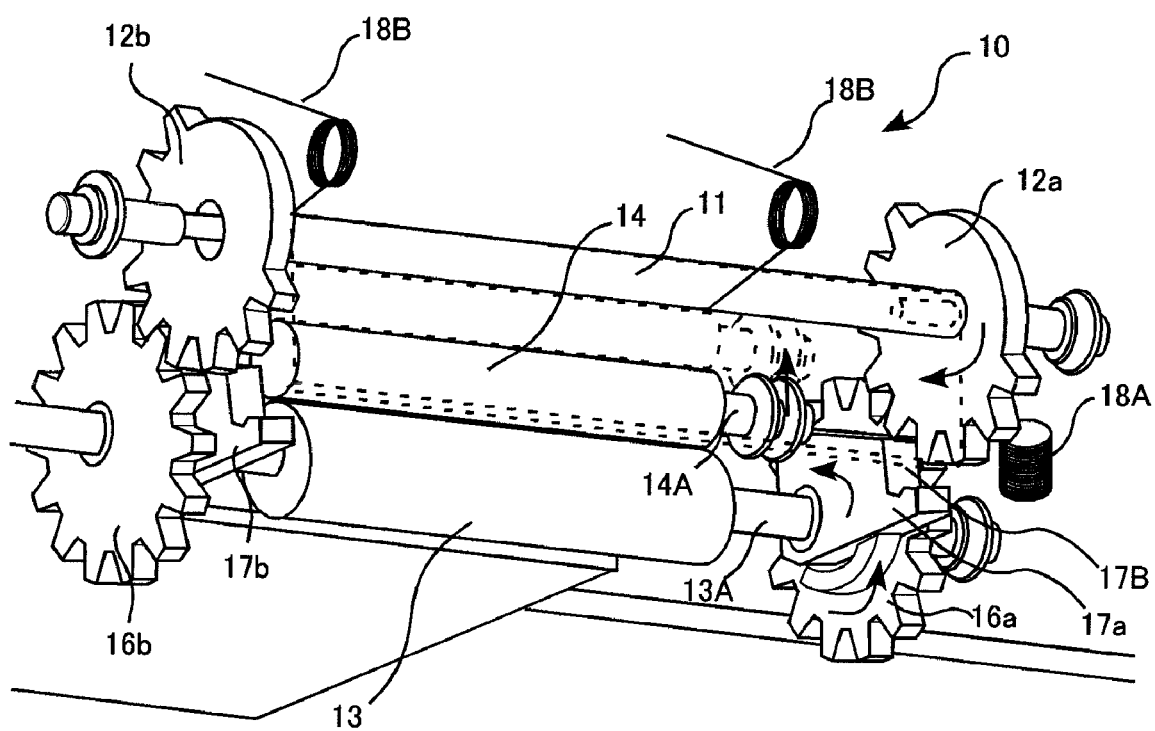
FIG. 8 is a diagram illustrating the schematic constitution of a recording medium insertion/ejection unit of the present invention.

FIG. 8 is a diagram illustrating the schematic constitution of the recording medium insertion/ejection unit. The recording medium insertion/ejection unit 10 in FIG. 8, which is provided adjacent to the rear of the medium insertion slot 19, carries out the operations of inserting the recording medium 2 into the device and ejecting the recording medium 2 out of the device.

The recording medium insertion/ejection unit 10 comprises a shutter 11 (indicated in FIG. 8 by broken lines) pivotably supported at a position in front of the medium insertion slot 19. The shutter 11 is urged by a shutter spring member 18A into a position for closing the medium insertion slot 19. The restoring force with which the shutter spring member 18A restores the position of the shutter 11 is set to be smaller than the force with which the recording medium 2 is inserted into the device. As a result, the shutter 11 can be opened easily through pushing of the front end of the recording medium 2 against the shutter 11. Shutter gears 12a, 12b, provided at both ends of the shutter 11, are pivotably supported together with the shutter 11.

The recording medium insertion/ejection unit 10 comprises a roller driving unit 15 for carrying out recording medium insertion and ejection of the recording medium 2 by pinching the latter. The roller driving unit 15 comprises the insertion roller 13 driven by an MF motor (medium feed motor) 52 and the driven roller 14 that is driven in response to the movement of the insertion roller 13.

The insertion roller 13 is mounted to a driving shaft 13A that is driven by the MF motor 52. Meanwhile, the driven roller 14 is supported, facing the insertion roller 13, on a support shaft that can move vertically. The driven roller 14 is normally urged toward the insertion roller 13 by a driven roller spring member 18B. The driven roller 14, urged by the driven roller spring member 18B, pushes the recording medium 2 against the insertion roller 13. This prevents idle running of the insertion roller 13 during transport of the recording medium 2. In FIG. 8 the driven roller 14 positioned in the vicinity of the insertion roller 13 is depicted with solid lines, and with broken lines when at a position resulting from upward displacement.

The driven roller 14 moves upward in concert with the swinging of the shutter 11. The shutter gears 12a, 12b mounted at both ends of the shutter 11 engage with cam gears 16a, 16b that swing in response to the opening and closing of the shutter 11. Levers 17a, 17b are mounted on the cam gears 16a, 16b in a way that they are freely rotatable coaxially with the cam gears 16a, 16b. Swinging of the levers 17a, 17b is effected through interlocking with the cam gears 16a, 16b. The cam gears 16a, 16b and the levers 17a, 17b can be provided coaxially with, and free relative to, the driving shaft 13A of the insertion roller 13.

The levers 17a, 17b have steps 17B of dissimilar distance relative to the center of the support shaft. The steps 17B function as a support for supporting the driven roller 14 at predetermined heights.

When the shutter 11 swings by being pushed by the recording medium 2, the shutter gears 12a, 12b mounted on the shutter 11 swing, whereupon the cam gears 16a, 16b engaging with the shutter gears 12a, 12b swing as well. Upon swinging, the cam gears 16a, 16b push the levers 17a, 17b, causing the latter to swing and push up the driven roller 14. The height to which the driven roller 14 is pushed up is determined by the swinging angle of the shutter 11. The swinging angle of the shutter 11 corresponds to the thickness of the recording medium 2, and hence the height to which the driven roller 14 is pushed up corresponds also to the thickness of the recording medium 2.

The levers 17a, 17b are free-mounted by way of shaft holes 17A that are not fixed to the support shaft. Hence the driven roller 14 is held at a hold position until pushed from the reverse direction through swinging of the cam gears 16a, 16b in the reverse direction.

During ejection of the recording medium 2, on the other hand, the recording medium 2 pushes the shutter 11 from the reverse direction causing the latter to swing in a reverse direction. The shutter 11 swinging in the reverse direction causes the shutter gears 12a, 12b and the cam gears 16a, 16b to swing in the reverse direction, releasing the driven roller 14 from the step 17B of the levers 17a, 17b where the driven roller 14 was supported. Upon leaving the step 17B of the levers 17a, 17b, the driven roller 14 is pushed towards the insertion roller 13 by the driven roller spring member 18B that urges the driven roller 14 in a push-down direction, and the driven roller 14 returns to the initial position.

In the recording medium insertion/ejection unit 10, the operation of inserting the recording medium 2 into the device and the operation of ejecting the recording medium 2 out of the device are substantially identical, except that, for instance, the driving directions are the reverse of each other, and that, during ejection, the driven roller 14 is returned from the hold position to the initial position.

Figure 9:
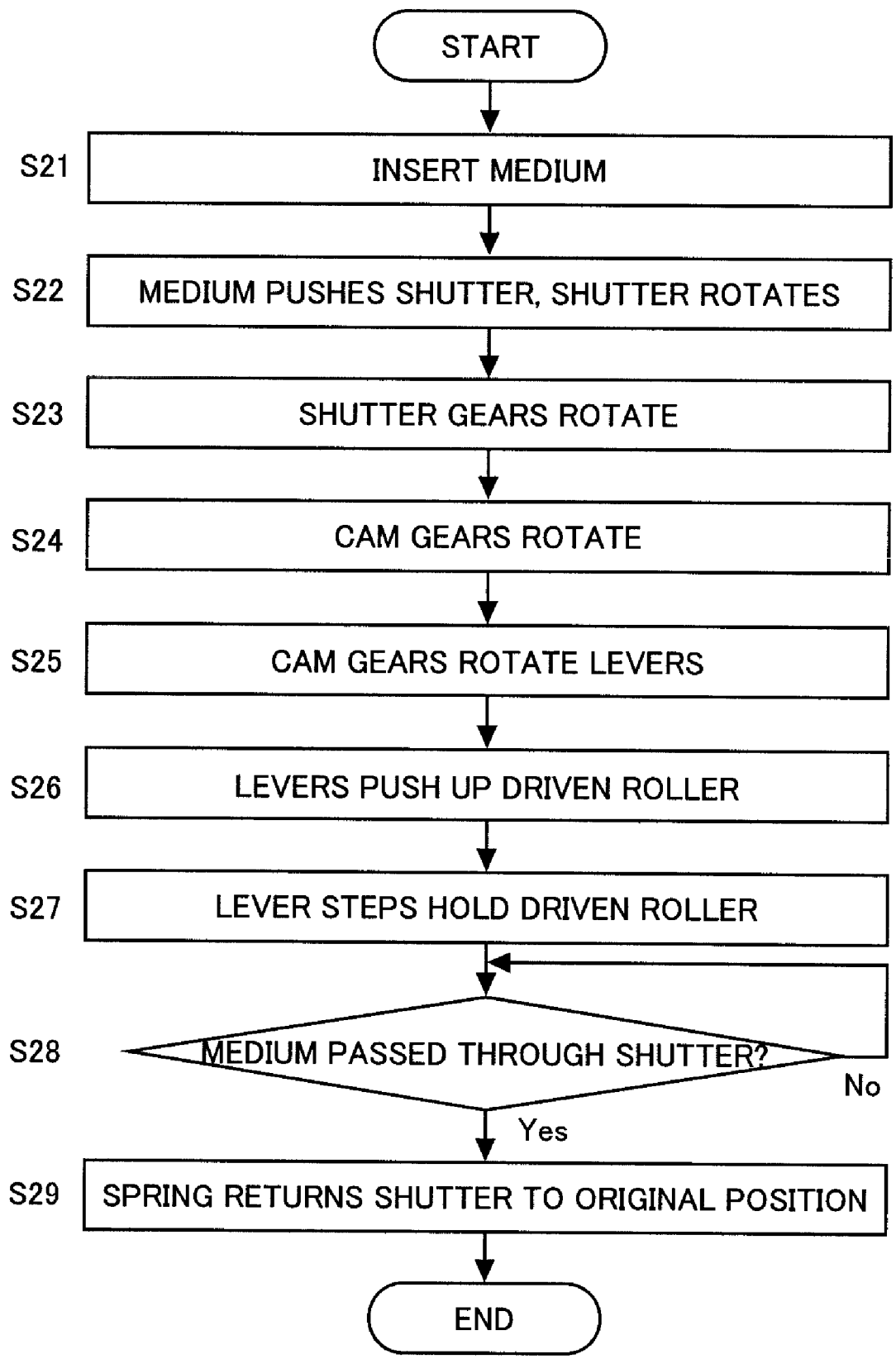
FIG. 9 is a flowchart for explaining an operation during insertion of a recording medium in the present invention.
Figure 10A:
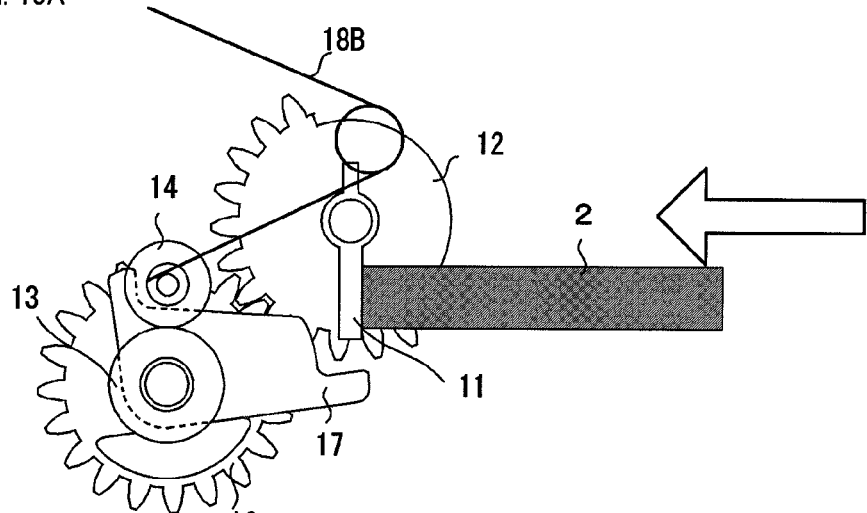
FIG. 10 is an operation explanatory diagram for explaining an operation during insertion of a recording medium in the present invention.
Figure 10B:
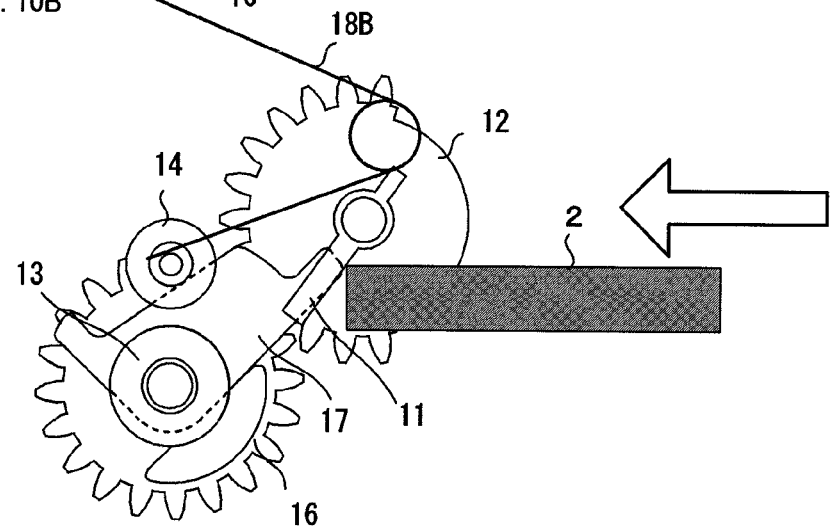
Figure 10C:
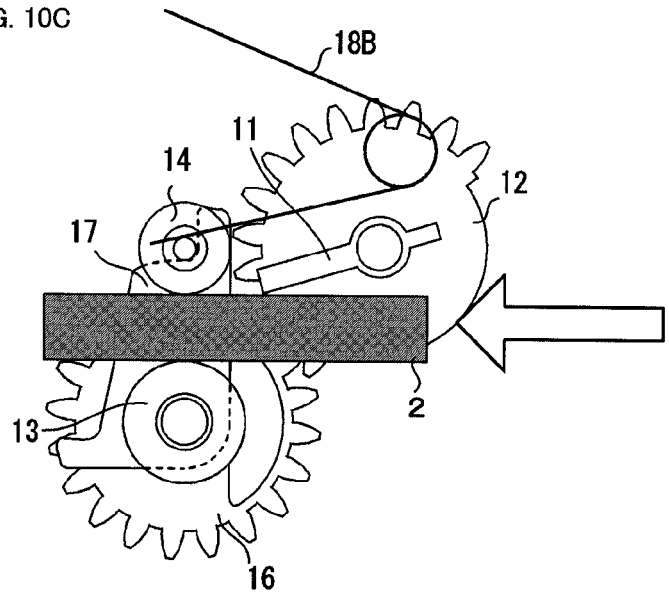
Figure 11A:
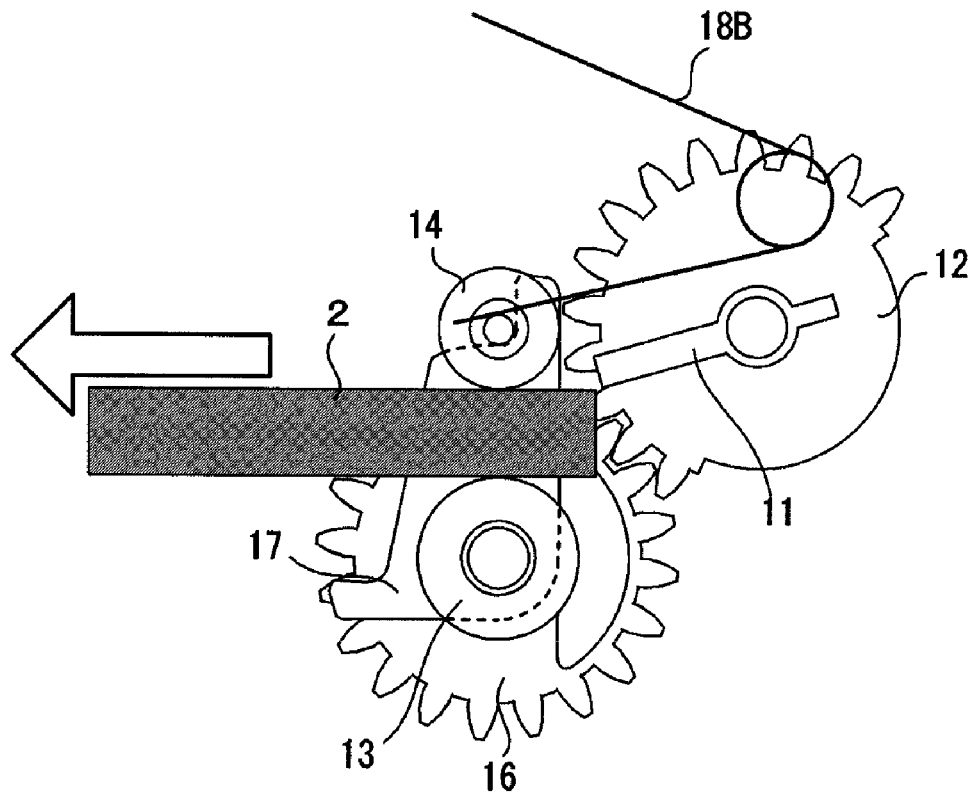
FIG. 11 is an operation explanatory diagram for explaining an operation during insertion of a recording medium in the present invention.
Figure 11B:
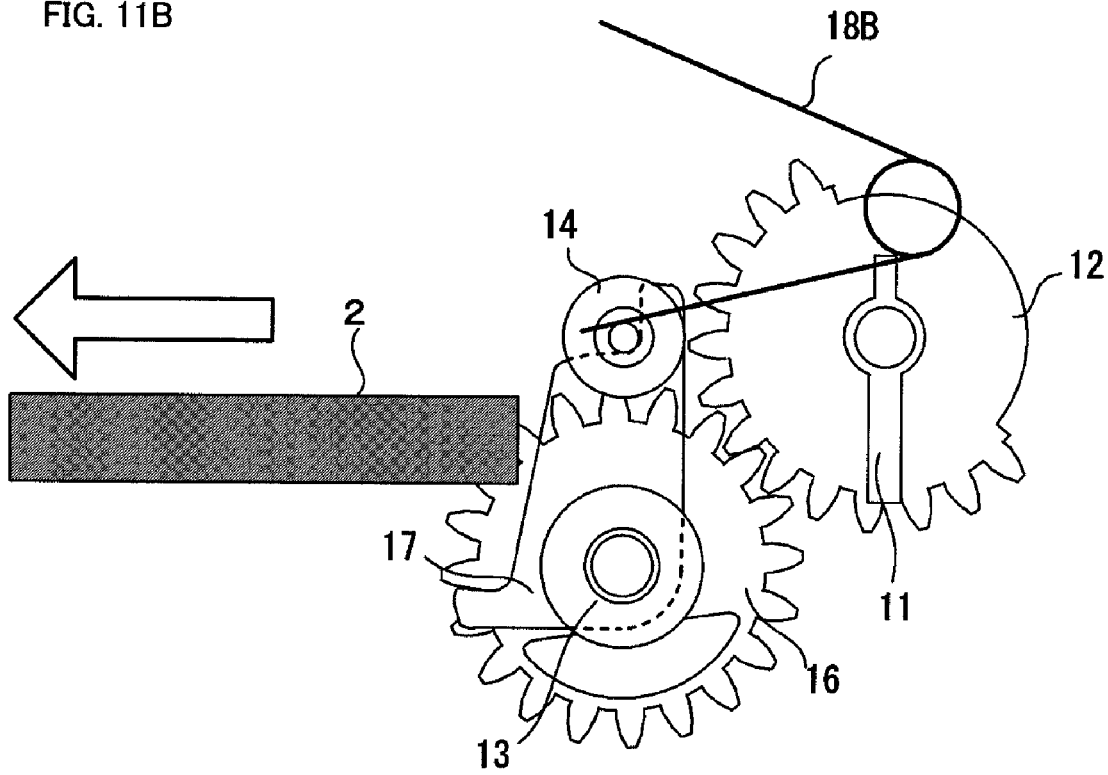

The operation for recording medium insertion is explained with reference to the flowchart of FIG. 9 and the operation explanatory diagrams of FIGS. 10 and 11.

When the recording medium 2 is inserted through the medium insertion slot 19 (FIG. 10A), (S21), the recording medium 2 pushes the shutter 11, causing the latter to swing (S22). In response to the swinging of the shutter 11, shutter gears 12a, 12b swing (S23), causing the cam gears 16a, 16b that engage with the shutter gears 12a, 12b to swing as well (S24).

As a result of the swinging of the cam gears 16a, 16b, the cams provided in the cam gears 16a, 16b come into contact with the levers 17a, 17b, causing the latter to swing (FIG. 10B), (S25). The levers 17a, 17b push up a driven shaft 14A of the driven roller 14, causing the latter to rise (FIG. 10B), (S26).

The levers 17a, 17b swing up to a position where the steps 17B thereof support the driven shaft 14A. The driven roller 14 becomes supported thus by the steps 17B and is held at the height determined by the steps 17B (FIG. 10C), (S27).

The driven roller 14 is held at the height position of the recording medium 2 passing through the shutter 11 by setting, in mutual agreement, the angular position at which the step 17B is provided, the thickness of the recording medium 2, and the angle to which the shutter 11 swings in accordance with that thickness.

As the recording medium 2 passes by the shutter 11 (FIG. 11A), (S28), the shutter 11 is returned to the original position thereof by the spring member 18A (FIG. 11B), (S29).

Figure 12:
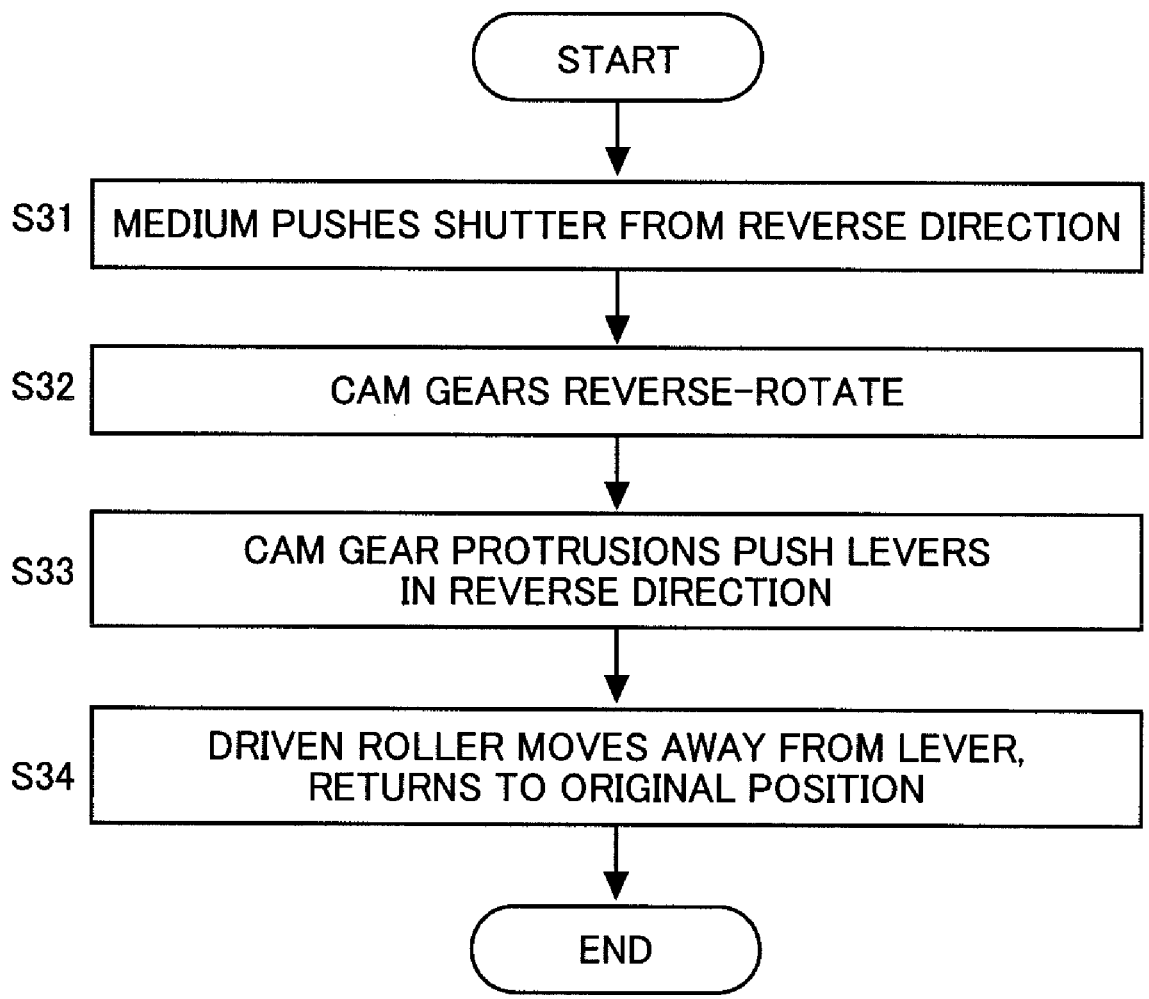
FIG. 12 is a flowchart for explaining an operation during ejection of a recording medium in the present invention.
Figure 13A:
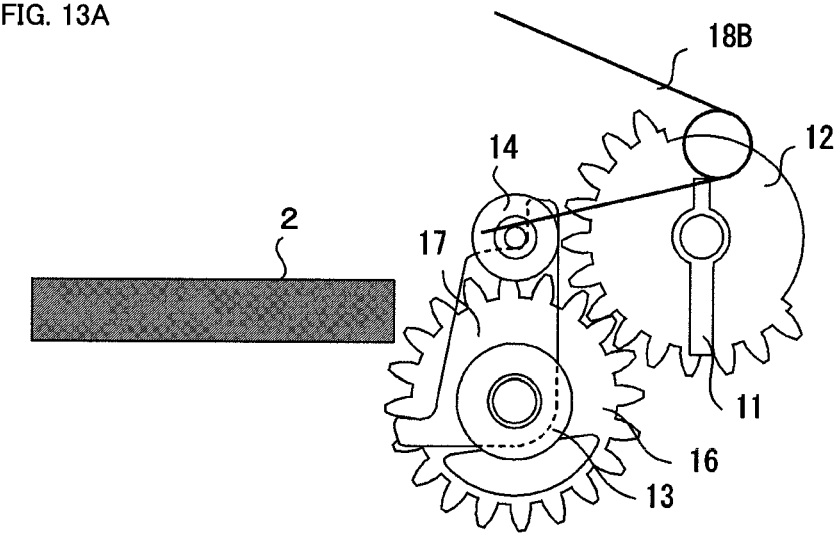
FIG. 13 is an operation explanatory diagram for explaining an operation during ejection of a recording medium in the present invention.
Figure 13B:
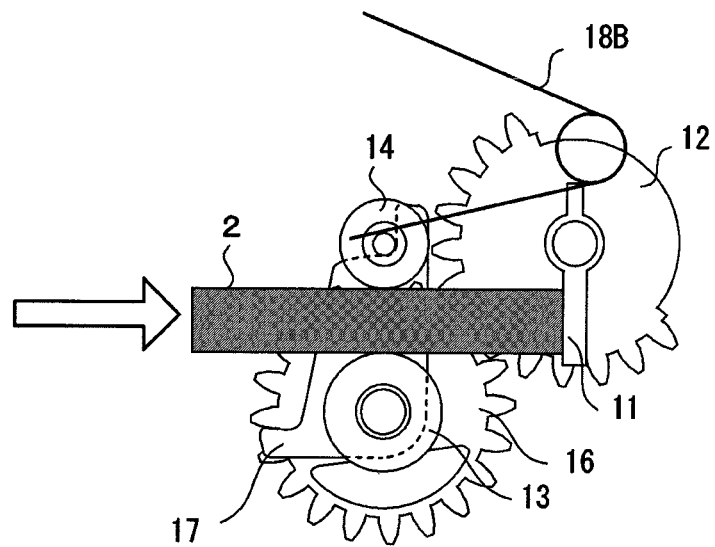
Figure 13C:
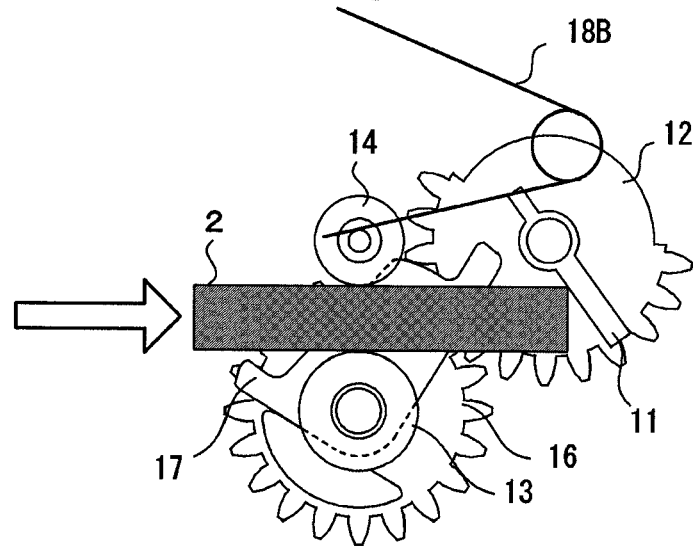
Figure 14A:
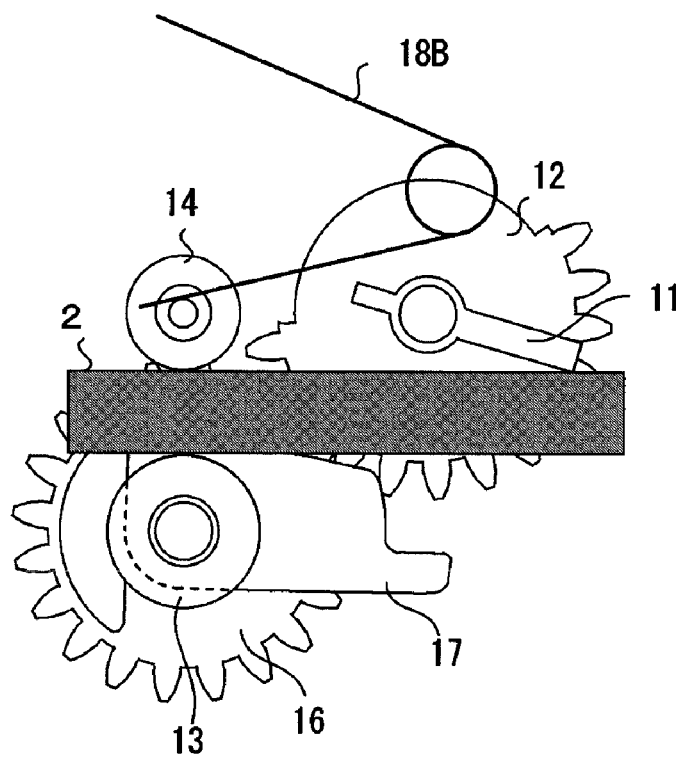
FIG. 14 is an operation explanatory diagram for explaining an operation during ejection of a recording medium in the present invention.
Figure 14B:
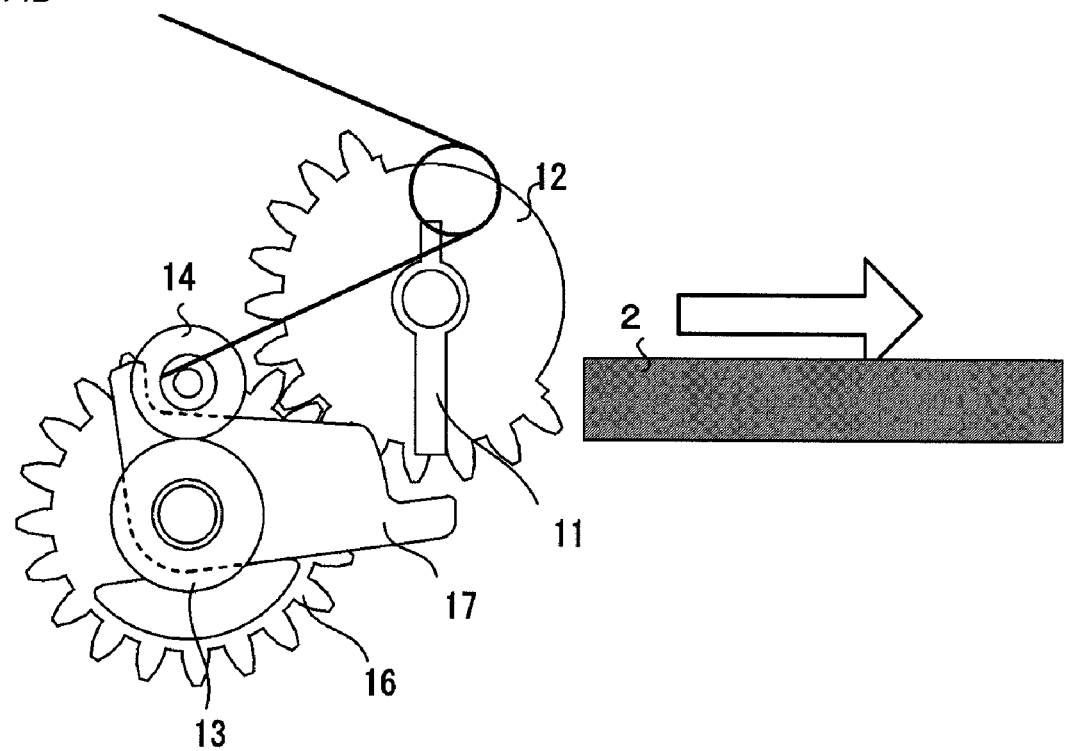

The operation for recording medium ejection is explained with reference to the flowchart of FIG. 12 and the operation explanatory diagrams of FIGS. 13 and 14.

During recording medium ejection, the recording medium 2 pushes the shutter 11 in the reverse direction. Herein the cam gears 16a, 16b and the driven roller 14 are held at the positions they occupied when the recording medium 2 was inserted passing through the roller driving unit 15 (FIGS. 13A, 13B), (S31).

When the shutter 11 is pushed in the reverse direction, the cam gears 16a, 16b swing in the reverse direction (FIG. 13C), (S32). The protruding portions provided in the cam gears 16a, 16b come immediately into contact with the levers 17a, 17b, causing the latter to swing in the reverse direction (FIG. 14A), (S33).

The cam gears are gear-coupled to the shutter. Hence, the cams return to the original position when the shutter returns to the original position as the recording medium passes by the shutter during insertion. At this time, there is virtually no gap between cams and levers in the return direction. Therefore, the protruding portions of the cams push the levers as soon as the shutter is pushed in the reverse direction. On the other hand, the looseness provided between the cams and levers is absorbed during insertion of the recording medium, as a result of which the shutter returns to the original position while the position of the levers is held. As a result of the swinging of the levers 17a, 17b, the levers 17a, 17b move away from the driven roller 14, and the driven roller spring member 18B pushes the driven roller 14 back towards the insertion roller 13 (FIG. 14B), (S34).

FIG. 15 is a diagram for explaining the relationship between the levers and the driven roller. FIG. 15A illustrates a constitution example of the lever 17. The lever 17 is rotatably supported by a shaft 13A in a shaft hole 17A. The lever 17 comprises a step 17B that temporarily holds the driven roller 14. There can be provided a plurality of steps 17B, in which case the respective steps 17B1, 17B2 have a different distance relative to the central position of the shaft hole 17A, so that the driven roller 14 can be held at different heights.

When the lever 17 stops at the holding angle at which the driven roller 14 is held, the step surface of the steps 17B1, 17B2 form a tilt of a predetermined angle ? relative to the horizontal plane, thus preventing the driven roller 14 from slipping off the step surface in case of vibration of the lever 17 and/or the driven roller 14.

FIG. 15B and FIG. 15C to 15E illustrate the relationship between the swinging angle of the lever 17 and the height of the driven roller 14. FIG. 15B illustrates three angle constitutions in a single diagram. FIG. 15C illustrates the situation prior to recording medium 2 insertion, FIG. 15D illustrates insertion of a thin recording medium 2, while FIG. 15E illustrates insertion of a thick recording medium 2.

When the recording medium 2 is thin the driven roller 14 is held by the step 17B1 of the lever 17. The driven roller 14 can be held at a low height position, corresponding to a thin recording medium 2, by setting a short distance between the step 17B1 and the central position of the shaft hole 17A.

When the recording medium 2 is thick, on the other hand, the driven roller 14 is held by the step 17B2 of the lever 17. The driven roller 14 can be held at a high height position, corresponding to a thick recording medium 2, by setting a long distance between the step 17B2 and the central position of the shaft hole 17A.

The step that holds the driven roller 14, among the steps provided in the lever 17, can be determined by the correspondence established between the swinging angle of the shutter 11 and the swinging angle of the lever 17, as described above.

The schematic constitution and schematic operation of the recording medium identification unit comprised in the medium identification device of the present invention are explained next with reference to FIGS. 16 to 19.

With reference to FIG. 16, the recording medium identification unit 30 comprises transmission type photosensors 31 and a reflective type photosensor 32. The transmission type photosensors 31 are optical sensors for identifying the type and the top/reverse of a recording medium to be identified. The type and the top/reverse of the recording medium are identified by combining the outputs of respective sensors arranged in accordance with the dimensions and/or shape of the recording medium. The reflective type photosensor 32, which is an optical sensor for discriminating between the top/reverse of a recording medium to be identified, is arranged in accordance with the electrode terminals of the recording medium. The top/reverse of the recording medium is identified on the basis of the difference between the intensity of light reflected by the electrode and the intensity of light reflected by portions other than electrode portions.

The transmission type photosensors 31 and the reflective type photosensor 32, provided in the table 21, detect the type and top/reverse of the transported recording medium 2. The transmission type photosensors 31 and the reflective type photosensor 32 provided at a predetermined position of the table 21 identify the recording medium 2. To achieve accurate identification, therefore, the recording medium 2 must be positioned relative to the table 21.

As described above, the recording medium 2 is positioned in the width direction by means of the pressure roller 24 that pushes the recording medium 2 against the medium transport roller 22.

Meanwhile, positioning of the recording medium 2 in the depth direction is effected by causing the front end of the recording medium 2 to abut the rack end face 4a or the stopper 4b of the connector rack 4, taking the rack end face 4a or the stopper 4b as a positioning reference. To carry out such positioning, the height of the connector rack 4 is adjusted in such a way that the rack end face 4a or the stopper 4b reaches a level at the same height as the recording medium 2 on the table 21.

Since the recording medium 2 is positioned in the width direction and the depth direction as described above, the positional relationship between the recording medium 2, the transmission type photosensors 31 and the reflective type photosensor 32 can be set to a same position at all times based on identification information.

Figure 16A:
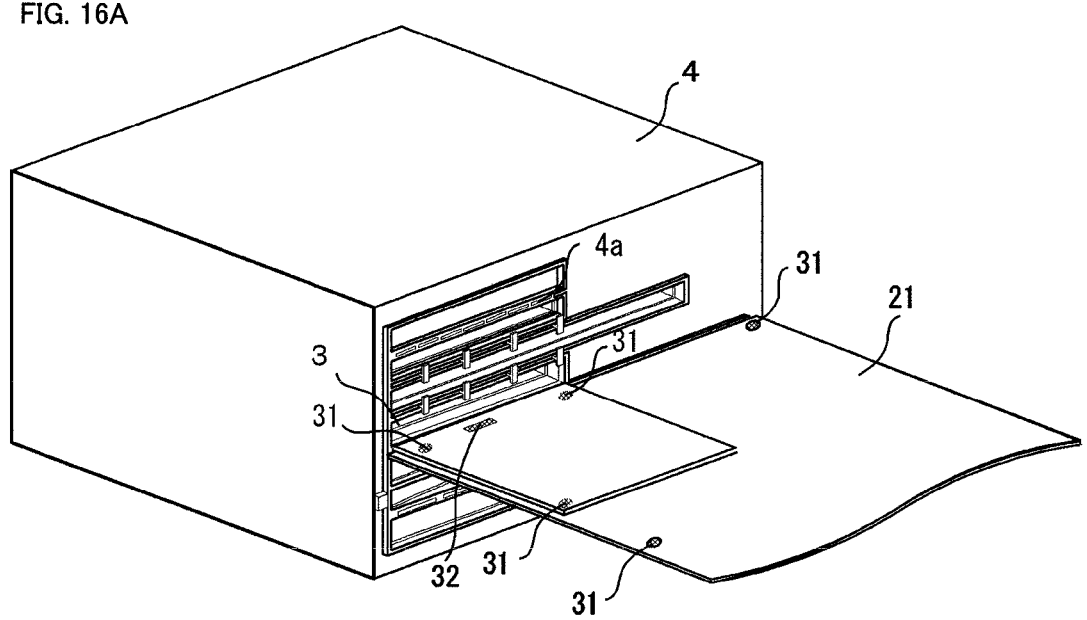
FIG. 16 is a diagram for explaining the schematic constitution of a recording medium identification unit comprised in the medium identification device of the present invention.
Figure 16B:
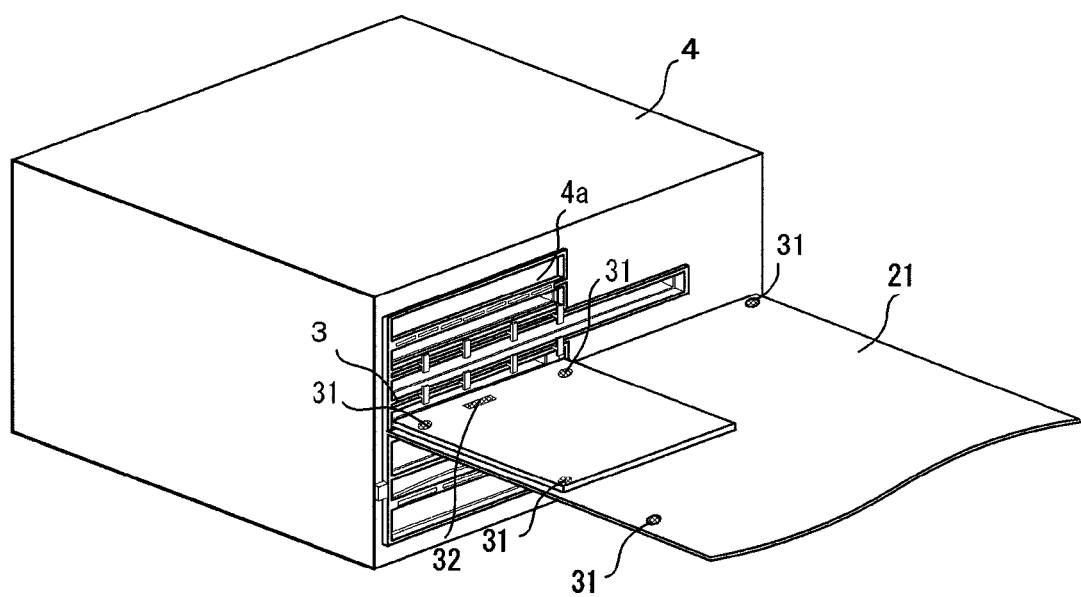

After detection of type and top/reverse at the position of FIG. 16A, the connector 3 is selected in accordance with the type, and as shown in FIG. 16B, the connector rack 4 is raised and set in such a way that the selected connector 3 is at the same height level as the recording medium 2 on the table 21.

The arrangement of the transmission type photosensors 31 and the reflective type photosensor 32 provided in the recording medium identification unit 30 is explained next with reference to FIGS. 17 to 19.

FIG. 17 illustrates an example where the type and top/reverse of two types of recording media are identified.

Figure 17A:
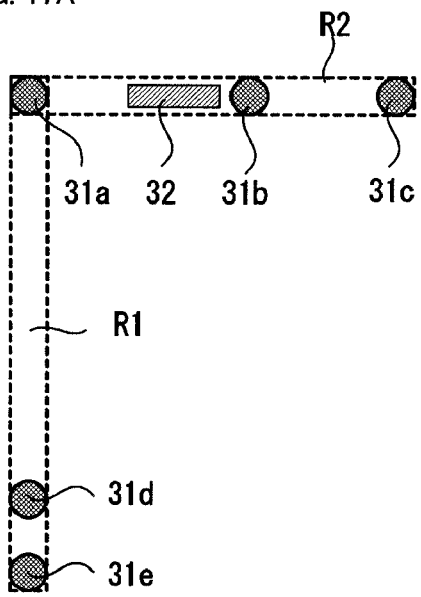
FIG. 17 is a diagram for explaining the schematic constitution of sensors comprised in the medium identification device of the present invention.

FIG. 17A illustrates an arrangement example of the transmission type photosensors 31 and the reflective type photosensor 32. The sensors provided in the recording medium identification unit 30 include a plurality of sensors 31a, 31d, 31e arranged in a band-like region R1 of predetermined width, in the depth direction, and a plurality of sensors 31a, 31b, 31c arranged in a band-like region R2 of predetermined width, in the width direction. The sensor 31a is provided at a position where the band-like region R1 and the band-like region R2 overlap. The sensor provided at a position where the band-like region R1 and the band-like region R2 overlap is not limited to one sensor, and may be provided as a plurality of sensors.

In FIG. 17A, the arrangement of the reflective type photosensor 32 in the band-like region R2 of predetermined width in the width direction allows detecting reflective portions such as contacts, and/or a cut provided in the recording medium.

Figure 17B:
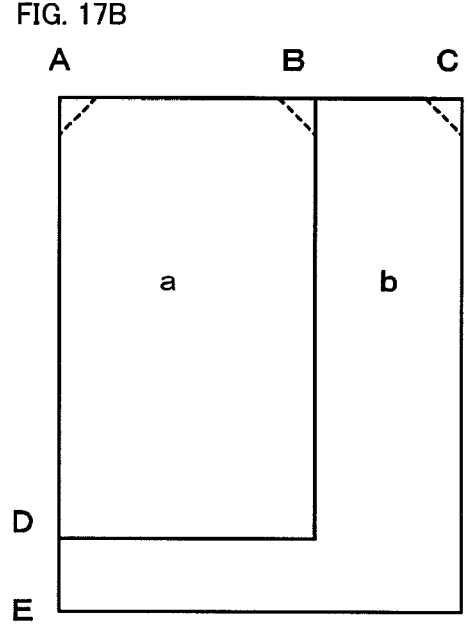
Figure 17C:
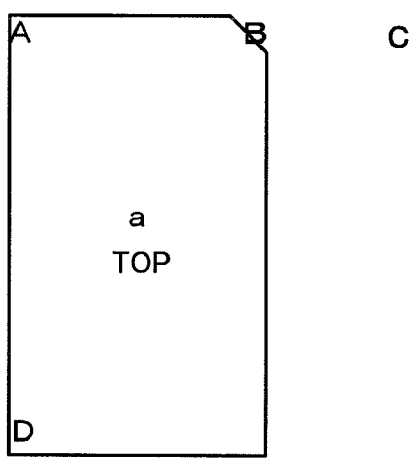

FIG. 17B illustrates two types of recording media a, b identified by the recording medium identification unit 30. The recording medium a and the recording medium b have both a cut out on the corner at the front end.

Transmission type photosensors A to E are arranged at positions corresponding to respective corners of the recording media a, b. Among the transmission type photosensors A to E, the transmission type photosensors A, B and D correspond to the recording medium a, and the transmission type photosensors A, C and E correspond to the recording medium b. The transmission type photosensors A to E correspond to the sensors 31a, 31b, 31c, 31d and 31e of FIG. 17A.

Figure 17D:
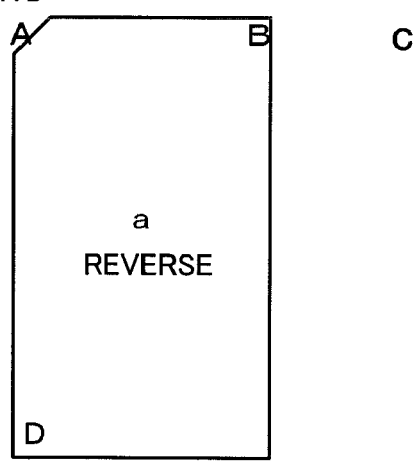
Figure 17E:
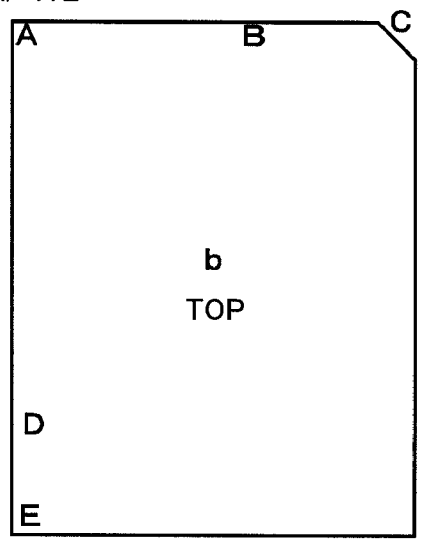
Figure 17F:
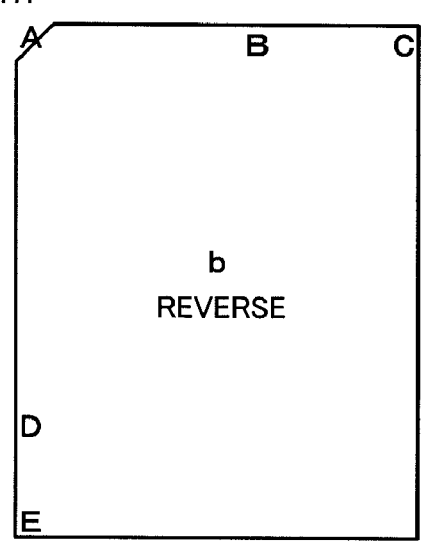

Herein, the output of the transmission type photosensors A and D is detected for the recording medium a in a top state (FIG. 17C), while the output of the transmission type photosensors B and D is detected for the recording medium a in a reverse state (FIG. 17D). The output of the transmission type photosensors A, B, D and E is detected for the recording medium b in a top state (FIG. 17E), while the output of the transmission type photosensors B, C, D and E is detected for the recording medium b in a reverse state (FIG. 17F).

Combining the two sensor outputs of the transmission type photosensor A and the transmission type photosensor E on the basis of the above output relationship allows identifying the type and top/reverse of the recording media a, b. The relationships between sensors and outputs are given in Table 1.

TABLE 1

|   |         | A | E |
|---|---------|---|---|
| a | Top     | ○ | X |
|   | Reverse | X | X |
| b | Top     | ○ | ○ |
|   | Reverse | X | ○ |

Similarly to the example of FIG. 17, FIG. 18 illustrates an example where the type and top/reverse of two types for recording media are identified. FIG. 18A illustrates two types of recording media a, c. The recording medium a and the recording medium c have both a cut out on the corner at the front end.

Transmission type photosensors A to E are arranged at positions corresponding to respective corner portions of the recording media a, c. Among the transmission type photosensors A to E, the transmission type photosensors A, B and D correspond to the recording medium a, and the transmission type photosensors A, C and F correspond to the recording medium c.

Figure 18A:
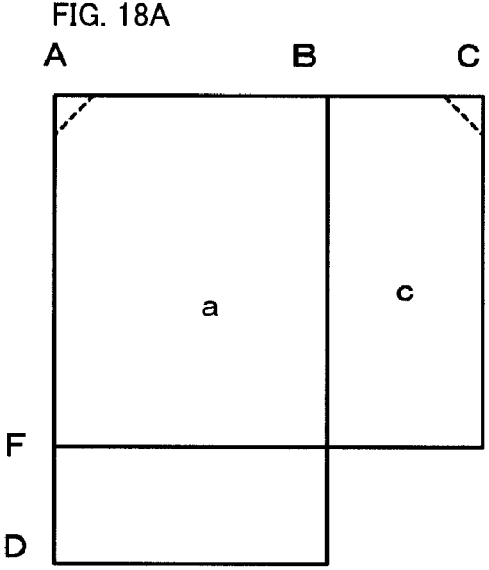
FIG. 18 is a diagram for explaining the schematic constitution of sensors comprised in the medium identification device of the present invention.
Figure 18B:
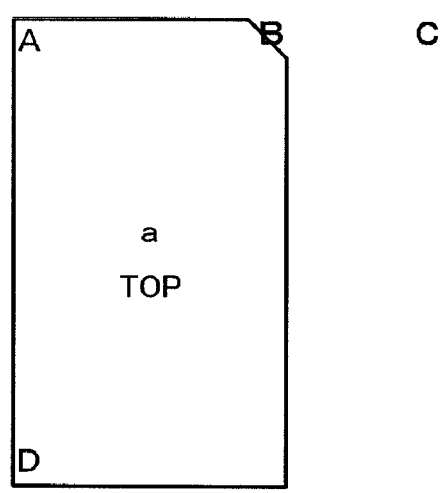
Figure 18C:
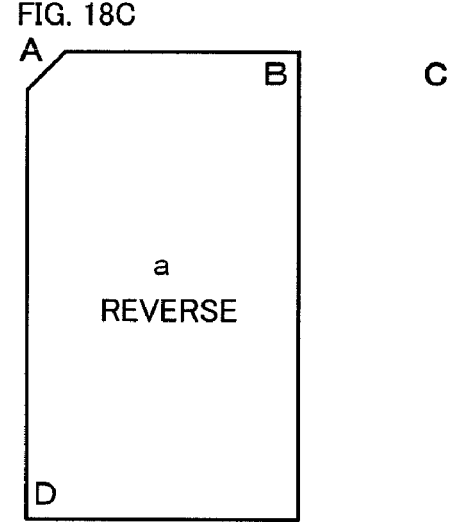
Figure 18D:
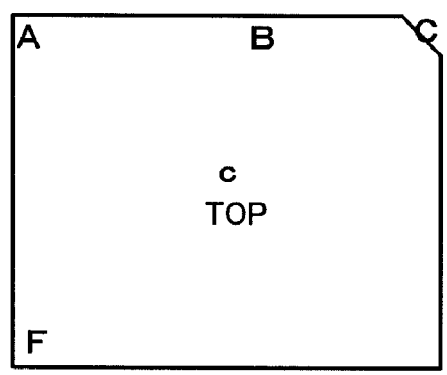
Figure 18E:
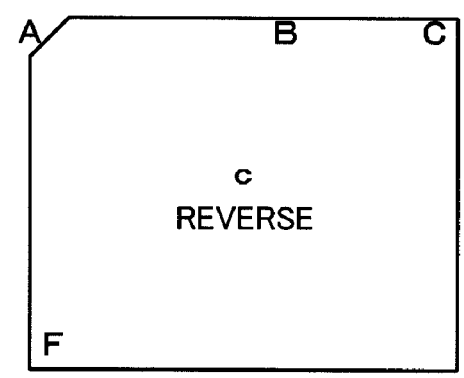

Herein, the output of the transmission type photosensors A and D is detected for the recording medium a in a top state (FIG. 18B), while the output of the transmission type photosensors B and D is detected for the recording medium a in a reverse state (FIG. 18C). The output of the transmission type photosensors A, B and F is detected for the recording medium c in a top state (FIG. 18D), while the output of the transmission type photosensors B, C and F is detected for the recording medium c in a reverse state (FIG. 18E).

Combining the two sensor outputs of the transmission type photosensor A and the transmission type photosensor D on the basis of the above output relationship allows identifying the type and top/reverse of the recording media a, c. The relationship between sensors and outputs is given in Table 2.

TABLE 2

|   |         | A | D |
|---|---------|---|---|
| a | Top     | ○ | ○ |
|   | Reverse | X | ○ |
| c | Top     | ○ | X |
|   | Reverse | X | X |

Figure 19:
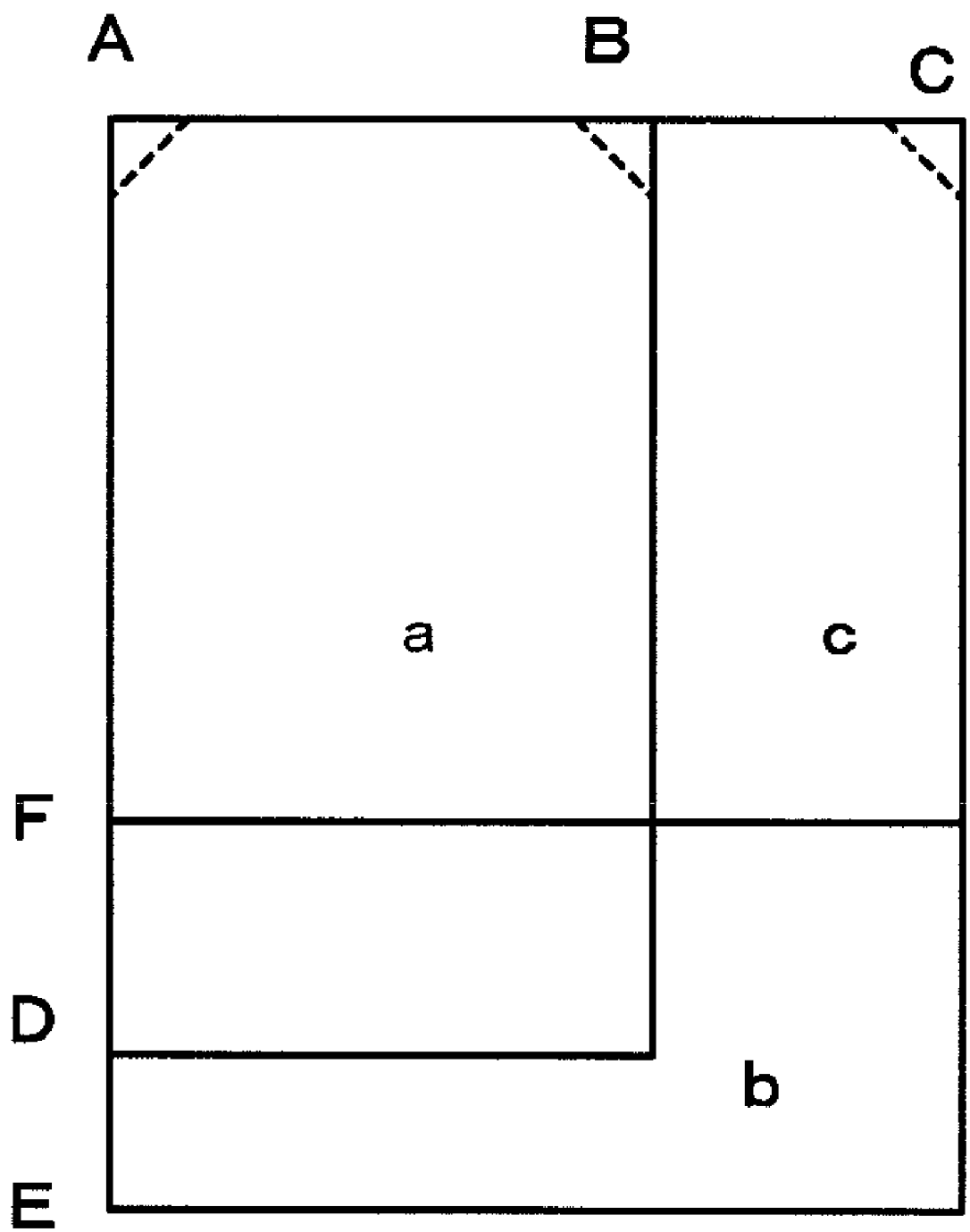
FIG. 19 is a diagram for explaining the schematic constitution of sensors comprised in the medium identification device of the present invention.
Figure 20A:
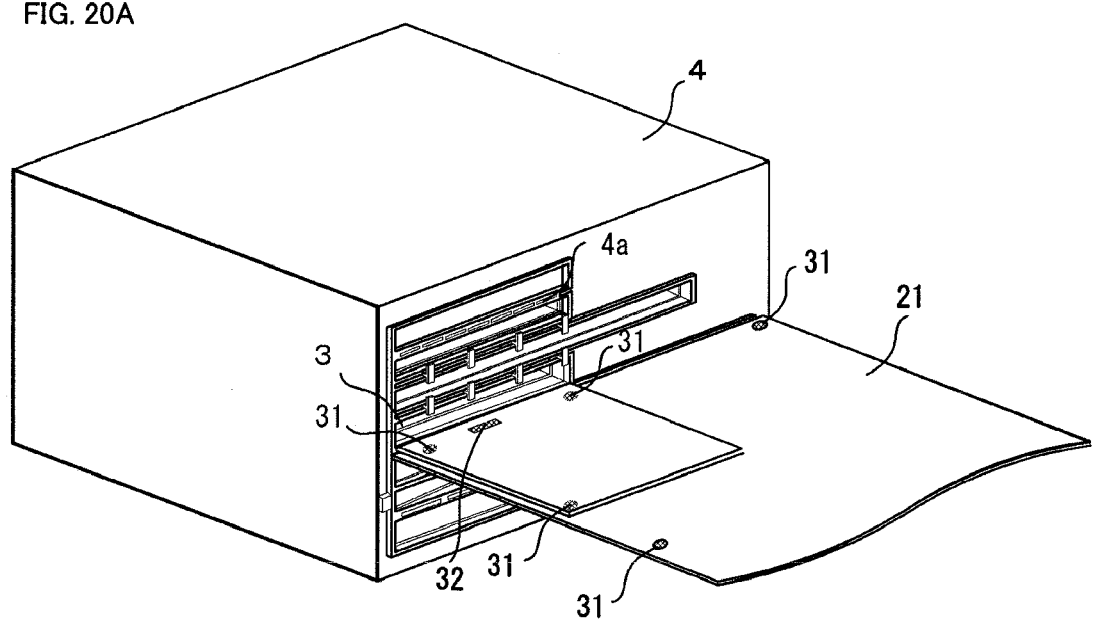
FIG. 20 is a diagram for explaining the schematic constitution of a recording medium setting/removing unit comprised in the medium identification device of the present invention.

FIG. 19 illustrates an example where the type and top/reverse of three types of recording media are identified. FIG. 19A illustrates three types of recording media a, b and c. The recording media a to c have all a cut out on the corner at the front end.

Combining four sensor outputs among those of transmission type photosensor A through transmission type photosensor F allows identifying the type and top/reverse of the recording media a, b and c. The relationship between sensors and outputs is given in Table 3.

TABLE 3

|   |         | A | B | C | D |
|---|---------|---|---|---|---|
| a | Top     | ○ | X | X | ○ |
|   | Reverse | X | ○ | X | ○ |
| b | Top     | ○ | ○ | X | ○ |
|   | Reverse | X | ○ | ○ | ○ |
| c | Top     | ○ | ○ | X | X |
|   | Reverse | X | ○ | ○ | X |

|   |         | A | B | C | E |
|---|---------|---|---|---|---|
| a | Top     | ○ | X | X | X |
|   | Reverse | X | ○ | X | X |
| b | Top     | ○ | ○ | X | ○ |
|   | Reverse | X | ○ | ○ | ○ |
| c | Top     | ○ | ○ | X | X |
|   | Reverse | X | ○ | ○ | X |

|   |         | B | C | D | E |
|---|---------|---|---|---|---|
| a | Top     | X | X | ○ | X |
|   | Reverse | ○ | X | ○ | X |
| b | Top     | ○ | X | ○ | ○ |
|   | Reverse | ○ | ○ | ○ | ○ |
| c | Top     | ○ | X | X | X |
|   | Reverse | ○ | ○ | X | X |

|   |         | B | C | D | F |
|---|---------|---|---|---|---|
| a | Top     | X | X | ○ | X |
|   | Reverse | ○ | X | ○ | X |
| b | Top     | ○ | X | ○ | ○ |
|   | Reverse | ○ | ○ | ○ | ○ |
| c | Top     | ○ | X | X | ○ |
|   | Reverse | ○ | ○ | X | ○ |

The schematic constitution and schematic operation of the recording medium setting/removing unit comprised in the medium identification device of the present invention are explained next with reference to FIGS. 20 to 22.

Figure 20B:
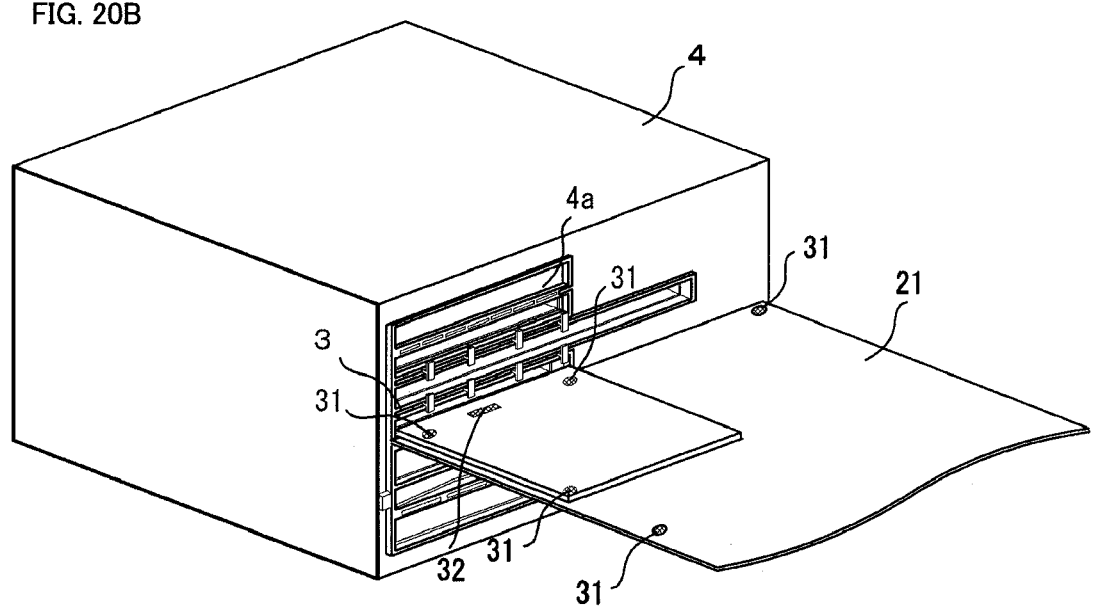

The recording medium 2 is set into the connector 3 after identification of the type of the recording medium 2 by the recording medium insertion/ejection unit 30, and selection of the connector 3 in accordance with the type of the recording medium. To set the recording medium 2 into the connector 3, the recording medium 2 is transported by the transport roller 21 toward the connector (FIG. 20A), after which the push lever 41 provided in the recording medium setting/removing unit 40 pushes the rear end of the recording medium 2. The connector 3 is of push-push type. The recording medium 2 is thus set by pushing the recording medium 2 into the insertion slot of the connector 3 and is removed by pushing again the rear end of the recording medium 2 set into the connector 3 (FIG. 20B).

Figure 21A:
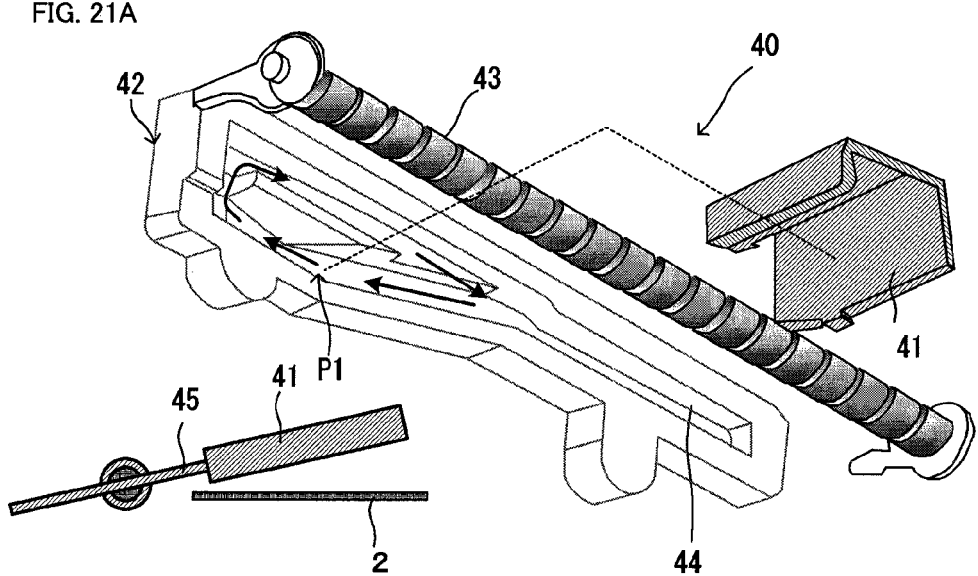
FIG. 21 is a diagram for explaining the schematic constitution of the recording medium setting/removing unit of the present invention.

FIG. 21 is a diagram for explaining the schematic constitution of the recording medium setting/removing unit. In FIG. 21A, the recording medium setting/removing unit 40 comprises a push lever 41, a push guide 42, a guide rod 43, a guide groove 44, an arm 45 and a pin 46. The arm 45 is slidable relative to the guide rod 43 in the axial direction and is mounted to be swingable around the axis. The pin 46 is provided at one end of the arm 45, and the pin 46 is slidable along the guide groove 44. The push lever 41 is provided at the other end of the arm 45. The push lever 41 and the pin 46 are arranged symmetrically with respect to the guide rod 43, so that the push lever 41 moves vertically as a result of the up-and-down movement of the pin 46 along the guide groove 44.

The push lever 41, which is a member that pushes the rear end of the recording medium 2, is provided at one end of the arm 45. The push guide 42 and the guide rod 43 are arranged along the transport direction of the recording medium 2. In the push guide 42 there is provided the guide groove 44 that guides the other end of the arm 45, while in the guide rod 43 there is provided a driving mechanism (not shown) whereby the arm 45 moves freely in the guide axial direction, the driving mechanism being mounted to be swingable around the axis of the guide rod 43.

The push lever 41 is a member for connecting the recording medium 2 with the connector 3, by pushing further back the recording medium 2 inserted into the connector 3 at a position in the vicinity of the insertion slot of the connector 3. In order to carry out such an operation, the push lever 41 must be brought to a height level identical to that of the recording medium 2.

The push lever 41, which can move along the transport direction of the recording medium and can swing in a direction perpendicular to the transport direction, sets and removes the recording medium 2 through an operation of pushing the recording medium 2 into the connector 3.

FIG. 21A to 21C and FIG. 22A to 22C illustrate the push lever 41 in various situations. The left side in the figures denotes the connector side, while the right side denotes the insertion slot side of the medium identification device 1. FIG. 22 illustrates the positional relationship between the push lever 41 and the recording medium 2.

Figure 21B:
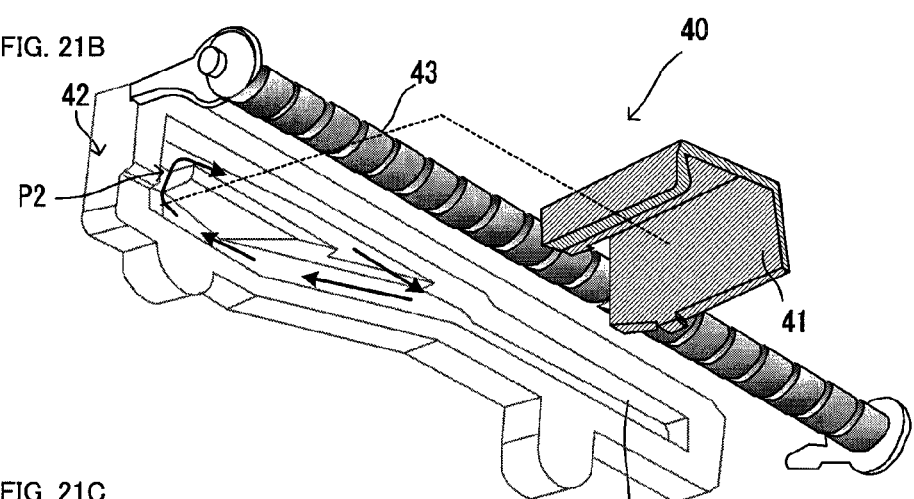
Figure 21C:
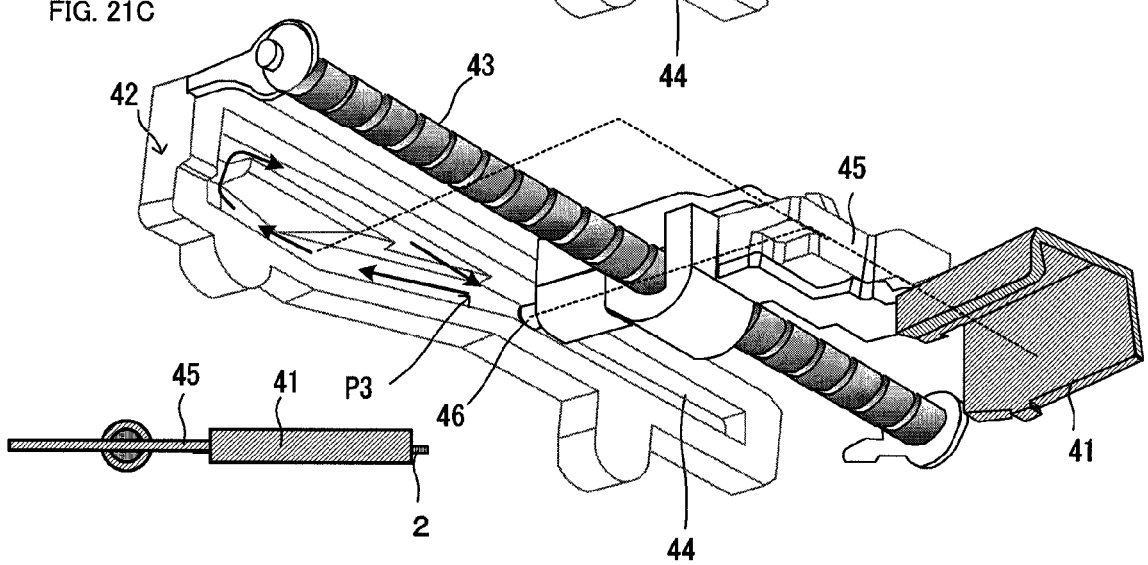
Figure 22A:
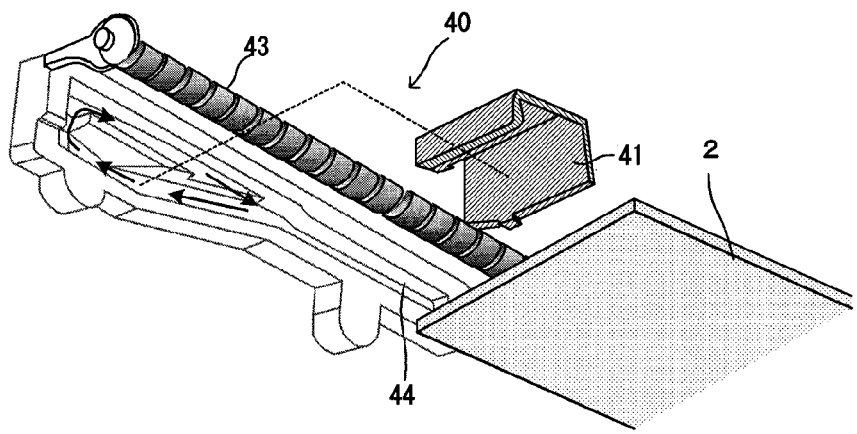
FIG. 22 is an operation diagram for explaining the operation of the recording medium setting/removing unit of the present invention.
Figure 22B:
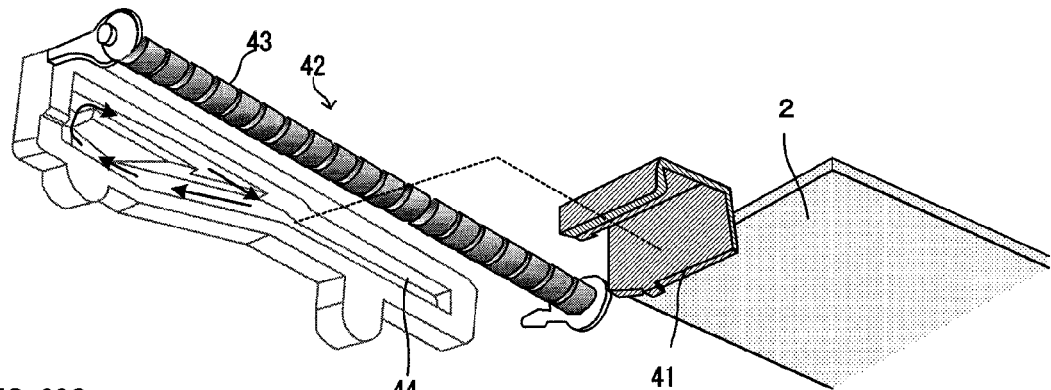
Figure 22C:
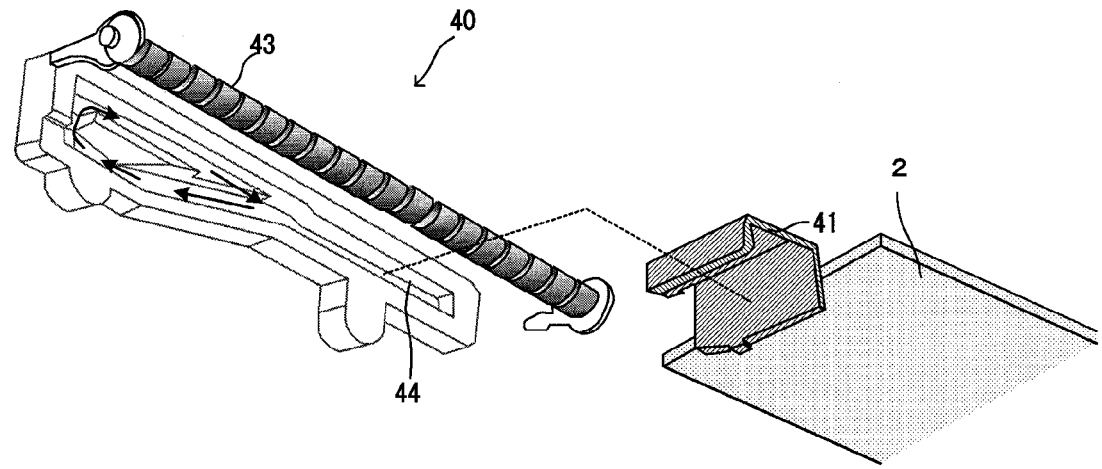

FIG. 21A and FIG. 22A illustrate the initial position, while FIGS. 21B, 21C and FIG. 22B illustrate the state of the operation after insertion of the recording medium 2, as the push lever 41 is displaced to the rear end position of the recording medium 2 in the depth direction. FIG. 22C illustrates the state of the operation as the push lever 41 pushes the rear end position of the recording medium 2 in the depth direction towards the connector.

In order to carry out the above operation, the pin 46 at one end of the arm 45 moves freely inserted in the guide groove 44, while the midway portion of the arm 45 is rotatably supported by the guide rod 43. The guide groove 44 forms a loop in the vertical direction, with different heights (P1, P2, P3) along the transport direction. The initial position is herein the lowermost position of that loop groove. The arm 45 moves thus freely along the guide rod 43. As a result of that movement, the pin 46 at one end of the arm 45 moves along the guide groove 44, thereby modifying the height of the push lever 41.

At the initial position of FIG. 21A and FIG. 22A, the pin 46 of the arm 45 is at the lowermost position of the guide groove 44, and hence the push lever 41 is raised up to a position higher than the travel path of the recording medium. Raising the push lever 41 to that position prevents the push lever 41 from interfering with the recording medium, thereby the transport of the recording medium is not impeded. As a result, nothing hampers the transport operation of the recording medium 2 while the recording medium 2 is being transported on the table 21 towards the connector 3. A sensor arranged in accordance with the initial position, for detecting the arm 45 and so forth, allows checking whether or not the arm 45 is at the initial position.

The recording medium is transported towards the connector while the push lever 41 is raised up. In order to connect the recording medium by pushing the latter into the insertion slot of the connector, the push lever 41 must trail the recording medium at the same height as the rear end of the recording medium.

As illustrated in FIG. 21B, therefore, the guide rod 43 is operated to bring the pin 46 back to the insertion side, after which it is raised up to the upper groove of the loop groove, moving the towards the connector. As a result, the push lever 41 is brought from a raised state to a lowered state, to a position behind the recording medium and at the same height as the rear end of the recording medium.

As illustrated in FIG. 21C and FIG. 22B, the guide 43 is operated to displace the pin 46 along the groove 44 towards the connector, whereupon the push lever 41 pushes the recording medium 2 against the connector (towards the right in FIG. 22), thereby setting the recording medium into the connector 3 and connecting both.

Figure 23:
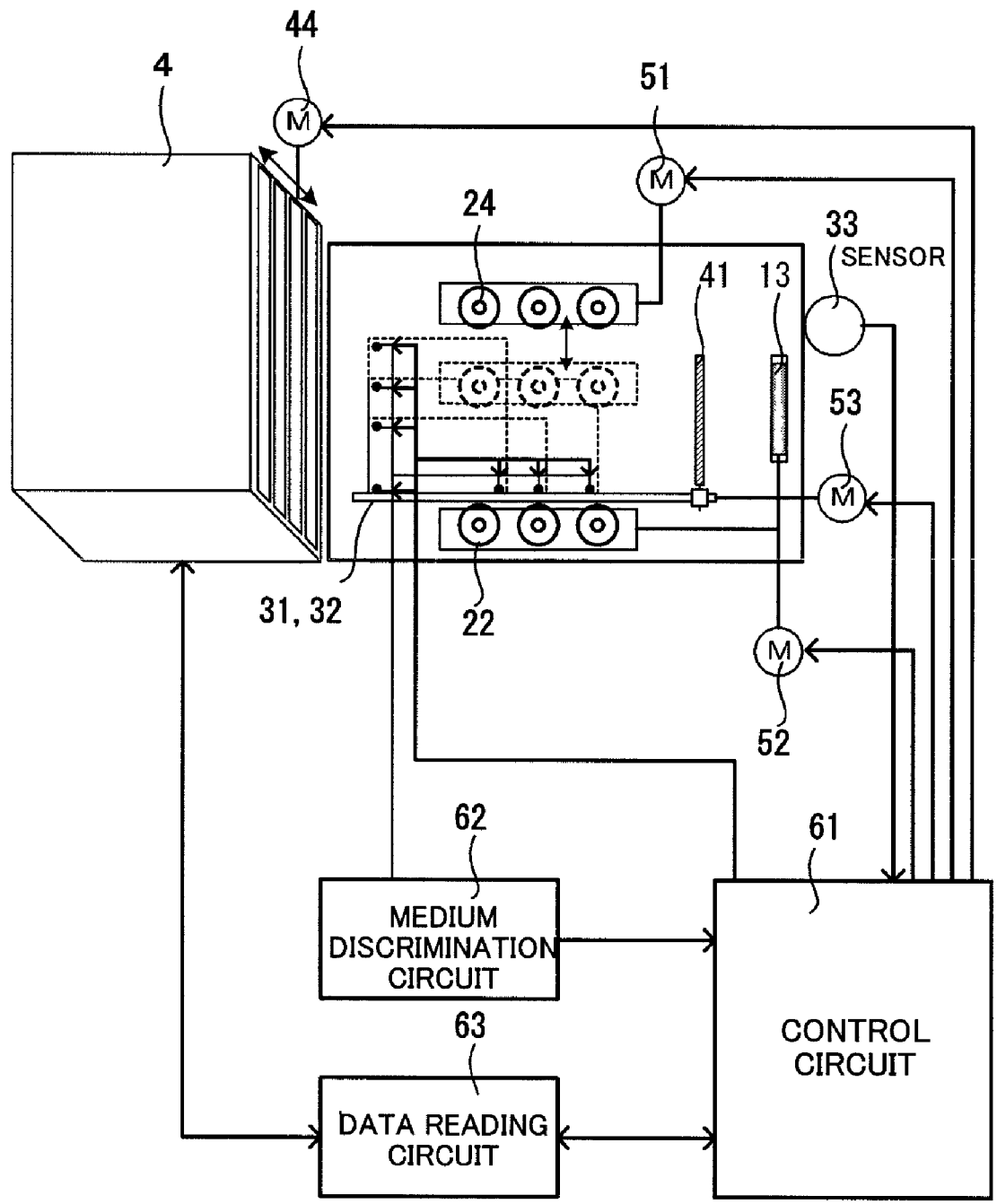
FIG. 23 is a diagram for explaining a control system of the medium identification device of the present invention.

The control system of the medium identification device of the present invention is explained next with reference to FIG. 23. The medium identification device 1 in FIG. 23 comprises a control circuit 61 for controlling the operation of the device as a whole, and comprises also a recording medium discrimination circuit 62 for identifying the type and the top/reverse of the recording medium 2 on the basis of the detection output of a sensor (the transmission type photosensors 31 or the reflective type photosensor 32), as well as a data reading circuit 63 for reading data stored in the recording medium 2 connected to the connector.

The control circuit 61, into which there is inputted the detection output of the shutter switch 33, outputs a control signal for controlling the drive of various motors including an SG motor (side guide motor) 51, an MF (medium feed motor) 52, a push lever motor 53 and a connector rack motor 54 for raising and lowering the connector rack 4. The control circuit 61 outputs also a control signal for initiating the driving of the sensors 31, 32. The MF (medium feed motor) 52 can double as a motor for driving the insertion roller 13 and as a motor for driving the medium transport roller 22.

Recording medium type signals, obtained as a result of identification by the recording medium discrimination circuit 62, are inputted to the control circuit 61, which controls then driving of the connector rack motor 54, selects a connector corresponding to the type, and moves the recording medium to a predetermined position for insertion.

Figure 24:
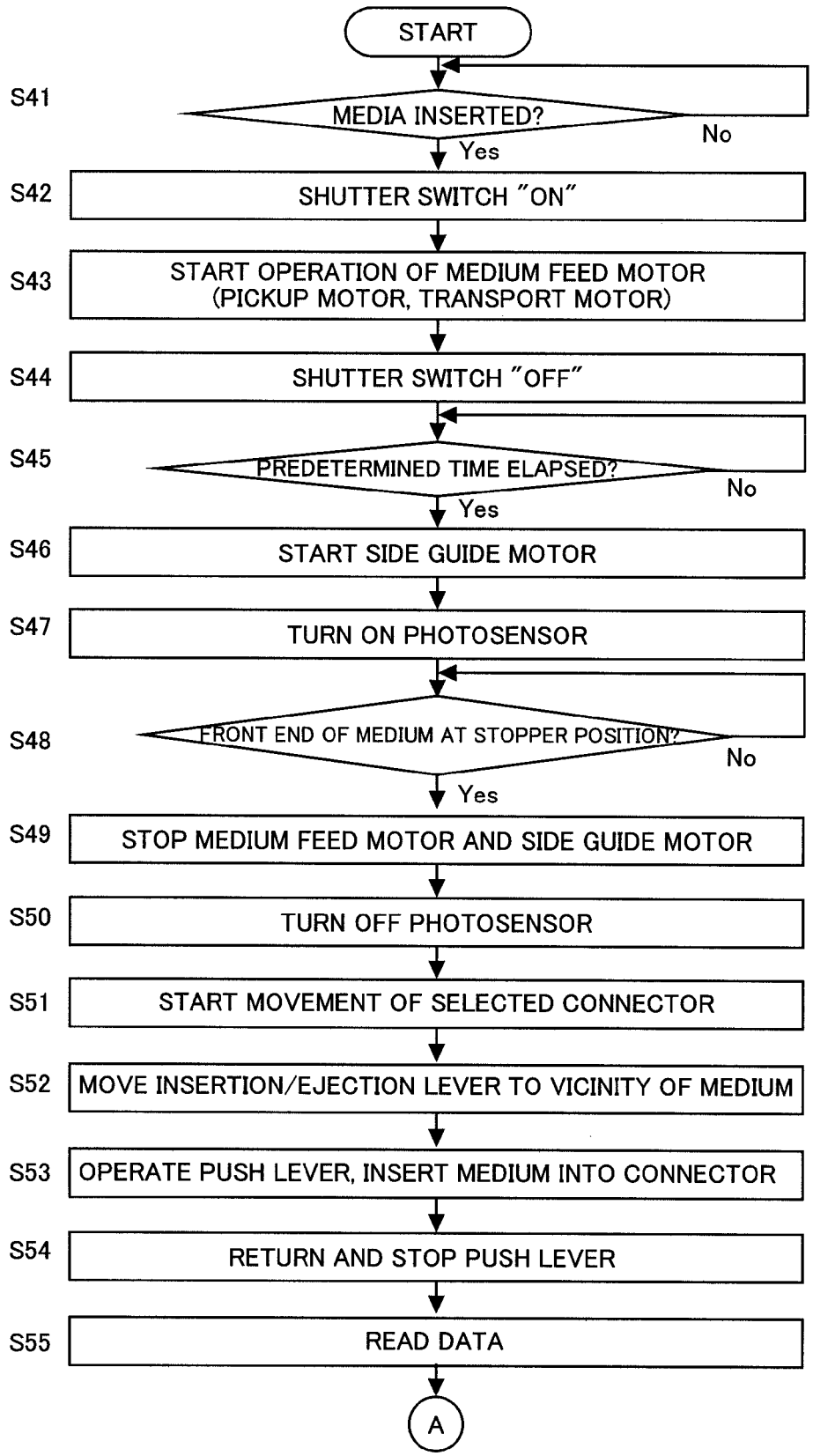
FIG. 24 is a flowchart for explaining a series of operations by the medium identification device of the present invention.
Figure 25:
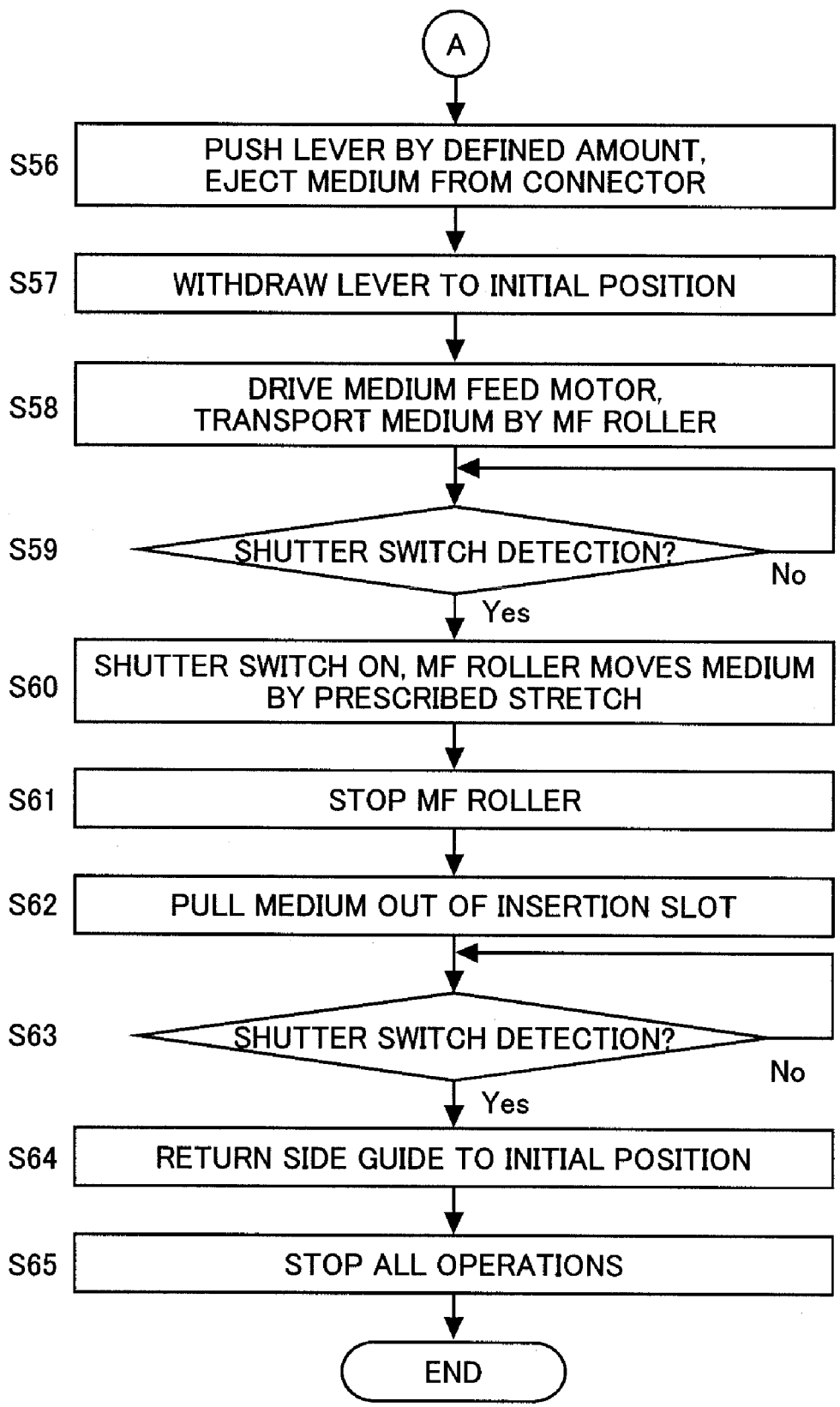
FIG. 25 is a flowchart for explaining a series of operations by the medium identification device of the present invention.
Figure 27A:
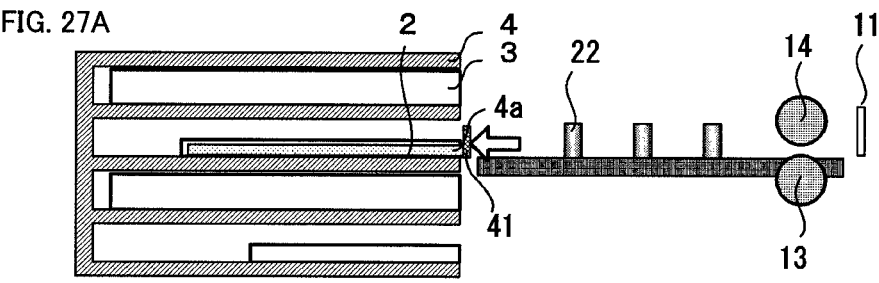
FIG. 27 is an operation diagram for explaining a series of operations by the medium identification device of the present invention.
Figure 27B:
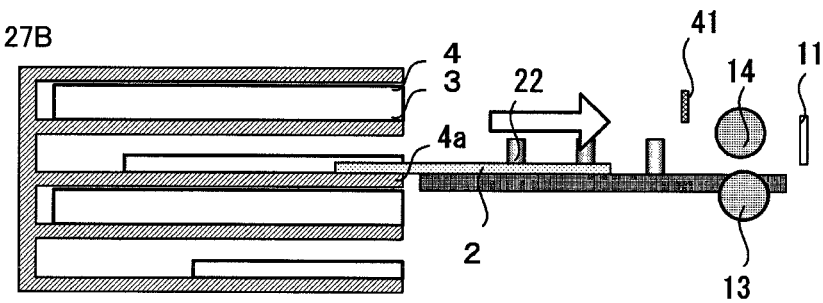
Figure 27C:
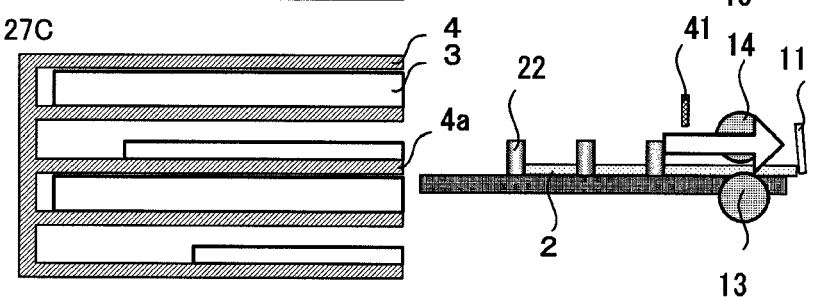
Figure 27E:
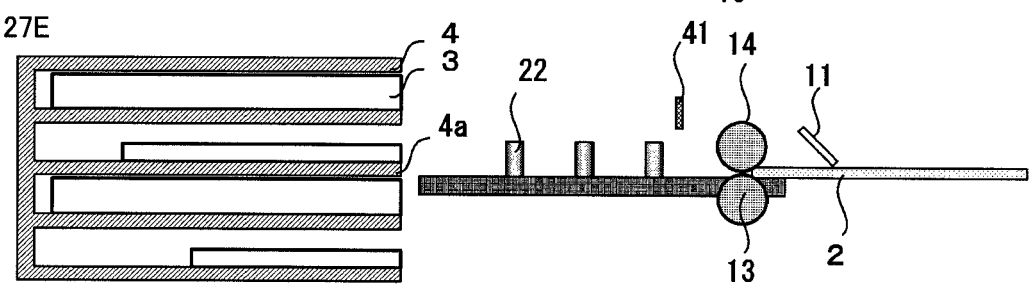
Figure 27D:
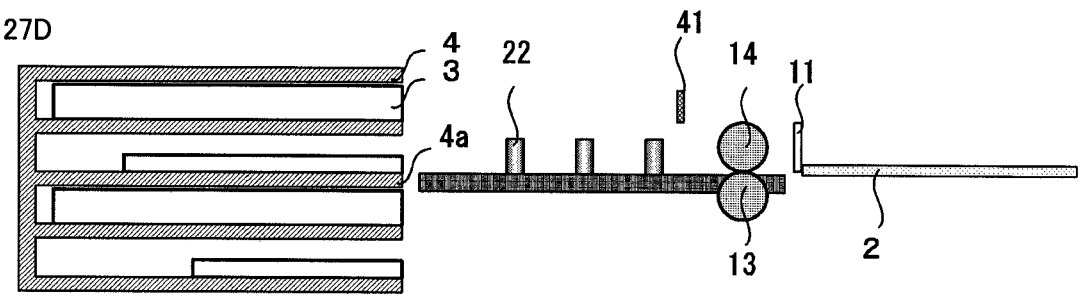

A series of operations by the medium identification device of the present invention is explained next with reference to FIGS. 24 to 27. FIGS. 24 and 25 are flowcharts for explaining the series of operations, and FIGS. 26 and 27 are operation diagrams for explaining the series of operations.

The shutter switch 33 for detecting the start of the opening operation of the shutter 11 is provided in the vicinity of the shutter 11. The shutter switch 33 is switched on when the shutter 11 is pushed upon insertion of the recording medium 2 (FIG. 26A), (S41), and the operation of the shutter 11 is detected (S42). On the basis of the detection signal of the shutter switch 33, the control circuit 61 inputs the MF motor 52 and starts driving the insertion roller 13 and the medium transport roller 22 (S43).

As the recording medium 2 passes by the shutter 11 (FIG. 26B), the shutter 11 is returned to the original position thereof by the spring member 18A. The shutter switch 33 is switched off as the shutter 11 returns to the original position (S44).

After sufficient time has elapsed for the recording medium 2 to be transported on the table 21 by the medium transport roller 22 (S45), the control circuit 61 starts the SG motor 51, and the recording medium is pushed against the medium transport roller 22 (FIG. 26C), (S46).

Simultaneously with the start of the SG motor 51, the control circuit 61 begins driving the sensors 31, 32, to elicit input of the detection signals from the sensors (S47).

On the basis of the detection signals, the control circuit 61 detects whether or not the front end position of the recording medium 2 is positioned at the stopper position (FIG. 26D), (S48).

The control circuit 61 stops driving the MF motor 52 and the SG motor 51 upon acknowledging that the recording medium is positioned at the stopper position (S49). After the recording medium discrimination circuit 62 determines that the type and top/reverse of the inserted recording medium 2 are correct, on the basis of the detection outputs of the sensors 31, 32, the control circuit 61 ceases driving the sensors 31, 32 (S50). The control circuit 61 can be set so as to reverse the medium transport roller 22 and eject the recording medium 2 when the top/reverse of the inserted recording medium 2 is incorrect.

The control circuit 61 selects a corresponding connector on the basis of the type of the recording medium identified by the recording medium discrimination circuit 62, and raises or lowers the connector rack 4 by controlling the driving of the rack motor 54 in such a way that the selected connector attains a predetermined position (a height at the same level as that of the recording medium on the table) (S51).

The control circuit 61 drives the push lever motor 53, whereupon the push lever 41 is displaced up to the rear end of the recording medium 2 (FIG. 26E), (S52). The operation time can be shortened by raising or lowering the connector rack 4 simultaneously with the displacement of the push lever 41 up to the rear end of the medium. The control circuit 61 drives the push lever motor 53, whereupon the push lever 41 pushes the rear end of the recording medium 2, setting the latter into the connector 3 (FIG. 26F), (S53). After setting of the recording medium 2, the push lever 41 backs away and stops, leaving a predetermined clearance to the recording medium 2 (S54).

The data reading circuit 63 reads data stored in the recording medium 2 connected to the connector 3 (S55).

After data reading, the control circuit 61 drives the push lever 53, whereupon the rear end of the recording medium 2 is pushed to a prescribed extent to elect the recording medium 2 from the connector 3. The recording medium 2 can be ejected from the connector 3 by using a push-push connector 3 (FIG. 27A), (S56).

The push lever 41 is withdrawn thereafter to a position where it does not impede the transport of the recording medium, moving for instance to the initial position, where it stops. (S57).

The control circuit 61 drives next the MF motor 52 to cause the recording medium 2 to be transported by the medium transport roller 22 (FIG. 27B), (S58). The operation time can be shortened by carrying out simultaneously the operation of withdrawing the push lever 41 and transport of the recording medium 2 by the medium transport roller 22. The transported recording medium 2 pushes the opposite side (device side) of the shutter 11, switching on thereby the shutter switch 33 (FIG. 27C (S59), whereupon the control circuit 61 drives the MF motor 52, causing the recording medium 2 to be transported a prescribed stretch by the insertion roller 13 (S60), after which the MF motor 52 is stopped. As a result, the recording medium 2 stops partially protruding through the medium insertion slot 19. In that situation, the shutter 11 is open, with the shutter switch remaining switched "on" (FIG. 27D), (S61).

When the user pulls the recording medium 2 out of the medium insertion slot 19 (FIG. 27E), (S62), the shutter switch becomes switched "off" (S63). Thereupon, the control circuit 61 controls the driving of the SG motor 51 to return the side guide to the initial position (S64), stopping thereafter all operations in the device (S65).

Table 4 displays the relationship between the above operations and the state of the various elements.

be identified based on the shape of the medium insertion slot. MD is the medium having the largest cross section, while the top/reverse of the medium are shaped asymmetrically. MD can thus be identified on the basis of such shape characteristics.

TABLE 5

| miniSD | Terminal | a | b | c | d | e | f | g | h |
|---|---|---|---|---|---|---|---|---|---|
| SD | Top | ○ | X | ○ | ○ | ○ | ○ | ○ | ○ |
|  | Reverse | X | ○ | ○ | ○ | ○ | ○ | ○ | ○ |
| SM3.3 | Top | X | X | ○ | ○ | X | ○ | ○ | ○ |
|  | Reverse | ○ | X | X | ○ | X | ○ | ○ | ○ |
| SM5 | Top | ○ | X | X | X | X | X | ○ | ○ |
|  | Reverse | X | X | X | ○ | X | X | ○ | ○ |
| CF/MD | Top | X | X | X | X | X | X | ○ | ○ |
|  | Reverse | X | X | X | X | X | X | ○ | ○ |
| Memory Stick Duo | Top | ○ | X | ○ | ○ | X | ○ | ○ | ○ |

TABLE 4

| User operation | Device operation | Shutter SW | MF motor | SG Motor | Push lever | Connector selection mechanism | Photo-sensor |
|---|---|---|---|---|---|---|---|
| Medium insertion through medium insertion opening |  | ON |  |  |  |  |  |
|  | Medium loading | ↓ OFF | ON: + ↓ OFF | ON: + ↓ OFF |  |  | ON ↓ ↓ OFF |
|  | Medium identification |  |  |  |  |  |  |
|  | Connector selection |  |  |  | ON: + ↓ OFF | ON ↓ OFF |  |
|  | Connector insertion |  |  |  | ON: + ON: − OFF |  |  |
|  | Data reading |  |  |  |  |  |  |
|  | Medium removal (Except CF/MD) | ON ↓ | ON: − ↓ OFF |  | ON: + ON: − OFF |  |  |
|  | Medium removal (CF/MD) | ON ↓ | ON: − ↓ OFF | ON: + ↓ OFF | ON: − OFF |  |  |
| Medium removal through medium insertion opening |  | OFF |  | ON: − OFF |  |  |  |

Examples of recording media identified by the medium identification device of the present invention are explained next with reference to FIG. 28 and Table 5.

Media that can be used as the recording medium include, for instance, miniSD™, SD™, SmartMedia™ (SM3.3, SM5), Memory Stick™, MMC™, RS-MMC™, xD-Picture Card™, Compact Flash (CF)®, Microdrive (Md)® and the like. ™ stands for a trade mark, and ® stand for a registered trade mark.

Figure 28:
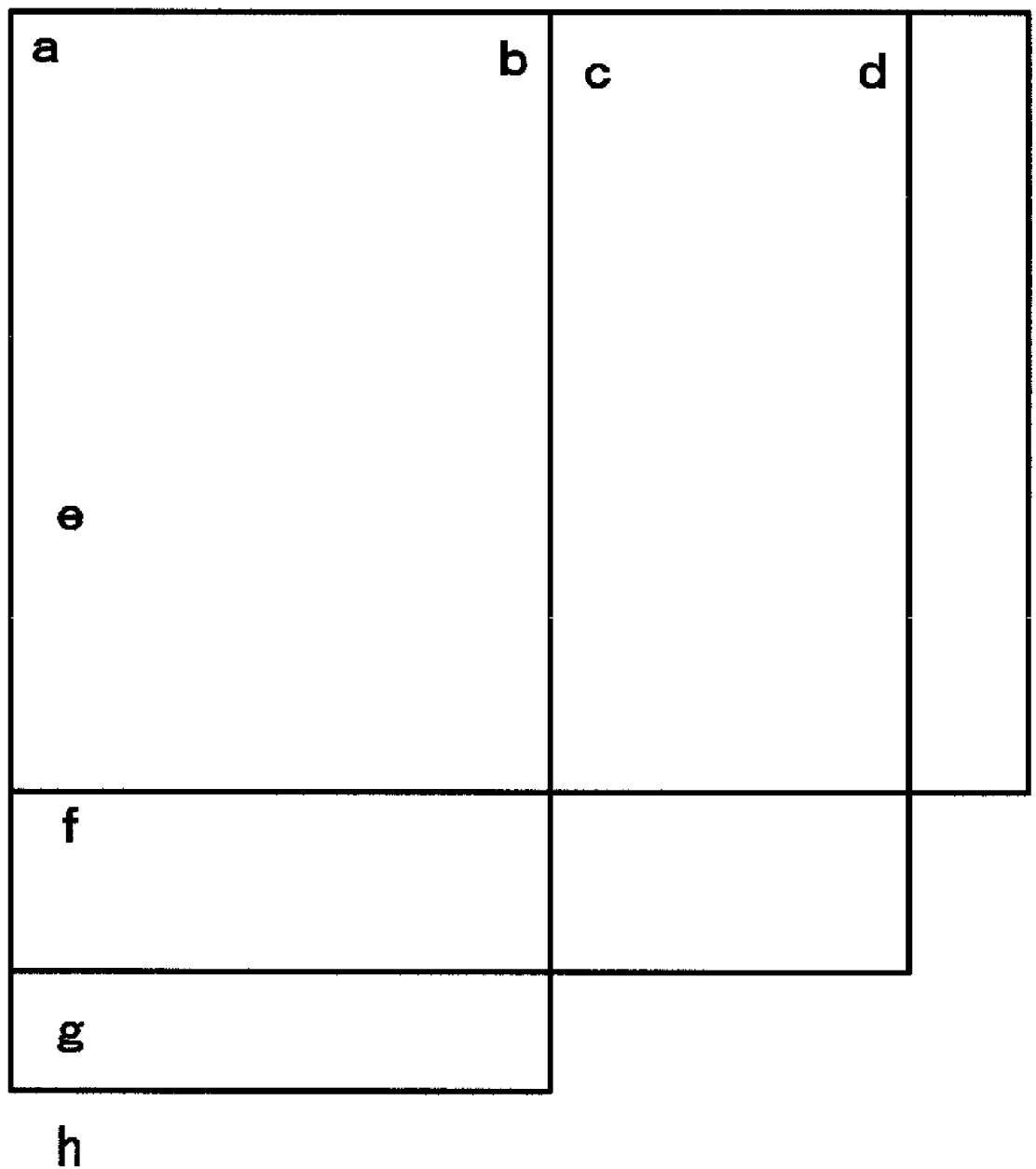
FIG. 28 is a diagram for explaining the schematic constitution of the recording medium identification unit comprised in the medium identification device of the present invention.

For instance, when transmission type photosensors are arranged at positions a to h illustrated in FIG. 28 in accordance with the dimensions of the respective recording media, the type and top/reverse of the recording media can be determined by combining (as in Table 5) the outputs detected by the transmission type photosensors.

XD discrimination can be carried out through detection of contact portions with the medium by a reflective type photosensor. CF can be identified through detection of the cut portion of the medium by a mechanical switch, while MD can TABLE 5-continued

| miniSD | Terminal | a | b | c | d | e | f | g | h |
|---|---|---|---|---|---|---|---|---|---|
|  | Reverse | X | ○ | ○ | ○ | X | ○ | ○ | ○ |
| Memory Stick | Top | ○ | X | ○ | ○ | X | X | X | ○ |
|  | Reverse | X | ○ | X | X | X | X | X | ○ |
| MMC | Top | X | X | ○ | ○ | X | ○ | ○ | ○ |
|  | Reverse | ○ | X | X | ○ | X | ○ | ○ | ○ |
| RS-MMC | Top | X | X | ○ | ○ | ○ | ○ | ○ | ○ |
|  | Reverse | ○ | X | X | ○ | ○ | ○ | ○ | ○ |
| XD-Picture Card | Top | X | X | X | ○ | ○ | ○ | ○ | ○ |
|  | Reverse | X | X | X | ○ | ○ | ○ | ○ | ○ |

What is claimed is:

1. A recording medium identification device for identifying the type of a recording medium inserted through an insertion slot, comprising:

a medium transport roller positioning the recording medium to a reference position in a depth direction;

a side guide positioning the recording medium to the reference position in a width direction;

a plurality of sensors arranged in a band-like region having a predetermined width, in said depth direction;

a plurality of sensors arranged in a band-like region having a predetermined width, in said width direction; and at least one sensor provided at an overlapping position of the respective band-like regions in the depth direction and the width direction for the recording medium positioned at the reference position.

2. A medium identification device, comprising:

a plurality of sensors including a plurality of transmission type photosensors and at least one reflective type photosensor;

wherein said transmission type photosensors are arranged at positions for detecting corners of a recording medium positioned at a predetermined position by a medium transport roller and a side guide pushing the recording medium to the predetermined position, said reflective-type sensor is arranged at a position for detecting an electric terminal of the recording medium positioned at the predetermined position, and wherein the type of the recording medium, or the type of the recording medium and the top/reverse of the recording medium are identified based on a detection signal of said transmission type photosensors, and the top/reverse of the recording medium is identified based on a detection signal of the reflective type photosensor.

* * * * *